(12) United States Patent
Anwar et al.

(10) Patent No.: US 8,183,820 B2
(45) Date of Patent: May 22, 2012

(54) POWER PROCESSING SYSTEMS AND METHODS FOR USE IN PLUG-IN ELECTRIC VEHICLES

(75) Inventors: Mohammad N. Anwar, Van Buren Township, MI (US); Erkan Mese, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 896 days.

(21) Appl. No.: 12/176,864

(22) Filed: Jul. 21, 2008

(65) Prior Publication Data

US 2010/0013438 A1    Jan. 21, 2010

(51) Int. Cl.
*H02J 7/14* (2006.01)

(52) U.S. Cl. ........ 320/104; 320/109; 320/123; 320/132; 320/135; 320/138; 320/140; 307/43; 180/65.1; 903/906; 903/907; 322/99

(58) Field of Classification Search .................. 320/104, 320/109, 123, 132, 135, 140, 138; 307/43–48, 307/52–53; 180/65.1–65.31; 363/15–19, 363/34–35; 903/903, 906, 907; 318/490–491; 322/99

See application file for complete search history.

(56) References Cited

U.S. PATENT DOCUMENTS

| | | | |
|---|---|---|---|
| 5,196,275 A | * | 3/1993 | Goldman et al. ............. 429/402 |
| 2003/0057003 A1 | * | 3/2003 | Kawada et al. .............. 180/65.1 |
| 2004/0062059 A1 | * | 4/2004 | Cheng et al. .................... 363/17 |
| 2004/0222754 A1 | * | 11/2004 | Ochiai et al. .................. 318/105 |
| 2007/0289794 A1 | * | 12/2007 | Ishikawa et al. .............. 180/165 |

* cited by examiner

*Primary Examiner* — Huy Q Phan
*Assistant Examiner* — Son Le
(74) *Attorney, Agent, or Firm* — Ingrassia Fisher & Lorenz, P.C.

(57) ABSTRACT

Embodiments include a power processing system and methods of its operation in a plug-in electric vehicle. The power processing system includes at least one AC electric motor, a bi-directional inverter system, and an electronic control system. The electronic control system provides a drive function by providing first control signals to the bi-directional inverter system which, in response, draws DC electrical power from a DC energy source, converts the DC power to AC power, and provides the AC power to windings of the at least one AC electric motor. The electronic control system also provides a charging function by providing second control signals to the bi-directional inverter system which, in response, draws AC power from the windings of the at least one AC electric motor, converts the AC power to DC power, and provides the DC power to the DC energy source in order to recharge the DC energy source.

19 Claims, 8 Drawing Sheets

POWER PROCESSING SYSTEMS AND METHODS FOR USE IN PLUG-IN ELECTRIC VEHICLES

TECHNICAL FIELD

Embodiments of systems and methods relate to power processing systems and methods for their use in plug-in electric vehicles (e.g., fully electric and hybrid electric vehicles).

BACKGROUND

A traditional plug-in electric vehicle (e.g., a fully electric or hybrid electric vehicle) uses an on-board or off-board battery charger to recharge the vehicle's battery from a utility alternating current (AC) outlet. When the vehicle is not being driven (e.g., when the vehicle is parked at home for the night), the vehicle's operator may connect the vehicle to an outlet via the battery charger. The battery charger is a may then draw current from the utility in order to recharge the battery.

Traditional battery chargers have several implications with respect to a vehicle's physical, manufacturing, and/or operational characteristics. For example, inclusion of an on-board battery charger in a plug-in electric vehicle adds to the overall weight of the vehicle, thus decreasing the vehicle's driving range for a given battery charge. In addition, as an additional component, a battery charger consumes physical space and adds to the vehicle's manufacturing cost.

Traditional battery chargers also may indiscriminately draw power from an electric utility, which may increase the overall cost, to a consumer, of operating a plug-in electric vehicle. Many utility companies have rate plans that include increased utility fees for power drawn during time periods when the utility company typically experiences peak usage (e.g., "peak usage time periods"). A peak usage time period may include, for example, a period between 5:00 p.m. and 11:00 p.m., when many consumers are at home for the evening performing power-consumptive activities (e.g., cooking, laundry, and so on). In addition, such a peak usage time period is likely to coincide with a time period when a plug-in electric vehicle's battery charger is connected to a utility AC outlet, as described above. When the battery charging process occurs during a peak usage time period, the utility fees charged to the consumer that are associated with recharging the battery may be higher than they would be if the battery were charged during a non-peak usage time period (e.g., a time period when the fees are lower, such as between midnight and 5:00 a.m.).

In order to increase the incentives for consumers to purchase and use plug-in electric vehicles, it is desirable to provide methods and apparatus to reduce the overall cost, to the consumer, for operating a plug-in electric vehicle. In addition, it is desirable to provide methods and apparatus to provide battery charging capabilities while reducing vehicle manufacturing cost, vehicle weight, and/or the physical space consumed by a traditional battery charger. Other desirable features and characteristics will become apparent from the subsequent detailed description and the appended claims, taken in conjunction with the accompanying drawings and the foregoing technical field and background.

SUMMARY

An embodiment of a power processing system for use in a plug-in electric vehicle includes at least one AC electric motor electrically coupled with a bi-directional inverter system, and an electronic control system. The electronic control system is operable to provide a drive function by providing first control signals to the bi-directional inverter system to cause the bi-directional inverter system to draw DC electrical power from a DC energy source of the vehicle, to convert the DC power to AC power, and to provide the AC power to windings of the at least one AC electric motor in order to propel the vehicle. The electronic control system also is operable to provide a charging function by providing second control signals to the bi-directional inverter system to cause the bi-directional inverter system to draw AC power from the windings of the at least one AC electric motor, to convert the AC power to DC power, and to provide the DC power to the DC energy source in order to recharge the DC energy source.

Another embodiment of a power processing system for use in a plug-in electric vehicle includes at least one AC electric motor electrically coupled with a bi-directional inverter system and with a traction system. In an embodiment, the bi-directional inverter system includes a plurality of switches, and is adapted cause the system to provide a drive function by drawing DC electrical power from a DC energy source of the vehicle in response to receiving first control signals, converting the DC power to AC power, and providing the AC power to windings of the at least one AC electric motor in order to propel the vehicle. The bi-directional inverter system also is adapted cause the system to provide a charging function by drawing AC power from the windings of the at least one AC electric motor in response to receiving second control signals, converting the AC power to DC power, and providing the DC power to the DC energy source in order to recharge the DC energy source.

An embodiment of a method for operating a power processing system of a plug-in electric vehicle, includes utilizing, during a first time period, windings of at least one AC electric motor and a bi-directional inverter system to provide a drive function by causing the bi-directional inverter system to draw DC electrical power from a DC energy source of the vehicle in response to receiving first control signals, to convert the DC power to AC power, and to provide the AC power to the windings of the at least one AC electric motor in order to propel the vehicle. The method also includes utilizing, during a second time period, the windings of the at least one AC electric motor and the bi-directional inverter system to provide a charging function by causing the bi-directional inverter system to draw AC power from the windings of the at least one AC electric motor in response to receiving second control signals, to convert the AC power to DC power, and to provide the DC power to the DC energy source in order to recharge the DC energy source.

BRIEF DESCRIPTION OF THE DRAWINGS

Embodiments of the inventive subject matter will hereinafter be described in conjunction with the following drawing figures, wherein like numerals denote like elements.

DETAILED DESCRIPTION

The following detailed description is merely exemplary in nature and is not intended to limit the scope or the application and uses of the inventive subject matter. Furthermore, there is no intention to be bound by any expressed or implied theory presented in the preceding technical field, background, summary or the following detailed description. In the following description, like reference numbers relate to like elements in each of the Figures.

Embodiments include power processing systems and methods for use with plug-in electric vehicles. The term "power processing" includes one or more power processing related functions that include, but are not limited to, a battery (or other direct current (DC) power source) charging function, an alternating current (AC) power source function, a utility-interconnected active power generator function, a utility-interconnected reactive power generator function, and/or a utility-interconnected active power filter function, each of which is described in more detail later. As used herein, the term "electric vehicle" includes both fully electric (e.g., electric only) vehicles and hybrid electric vehicles. Accordingly, as used herein, the term plug-in electric vehicle may mean either or both a plug-in fully electric vehicle and a plug-in hybrid electric vehicle (PHEV). Embodiments may be integrally included in a plug-in electric vehicle, an on-board battery charger, and/or an off-board battery charger.

The following description refers to system components, elements, nodes or features being "coupled" together. As used herein, unless expressly stated otherwise, the term "coupled" means that one component/element/node/feature is directly or indirectly joined to (or directly or indirectly communicates with) another component/element/node/feature, and not necessarily mechanically. Thus, although the schematics shown in FIGS. 2-7 depict various exemplary arrangements of components/elements/nodes/features, additional intervening components, elements, nodes, features, or devices may be present in other embodiments of the depicted subject matter.

Figure 1:
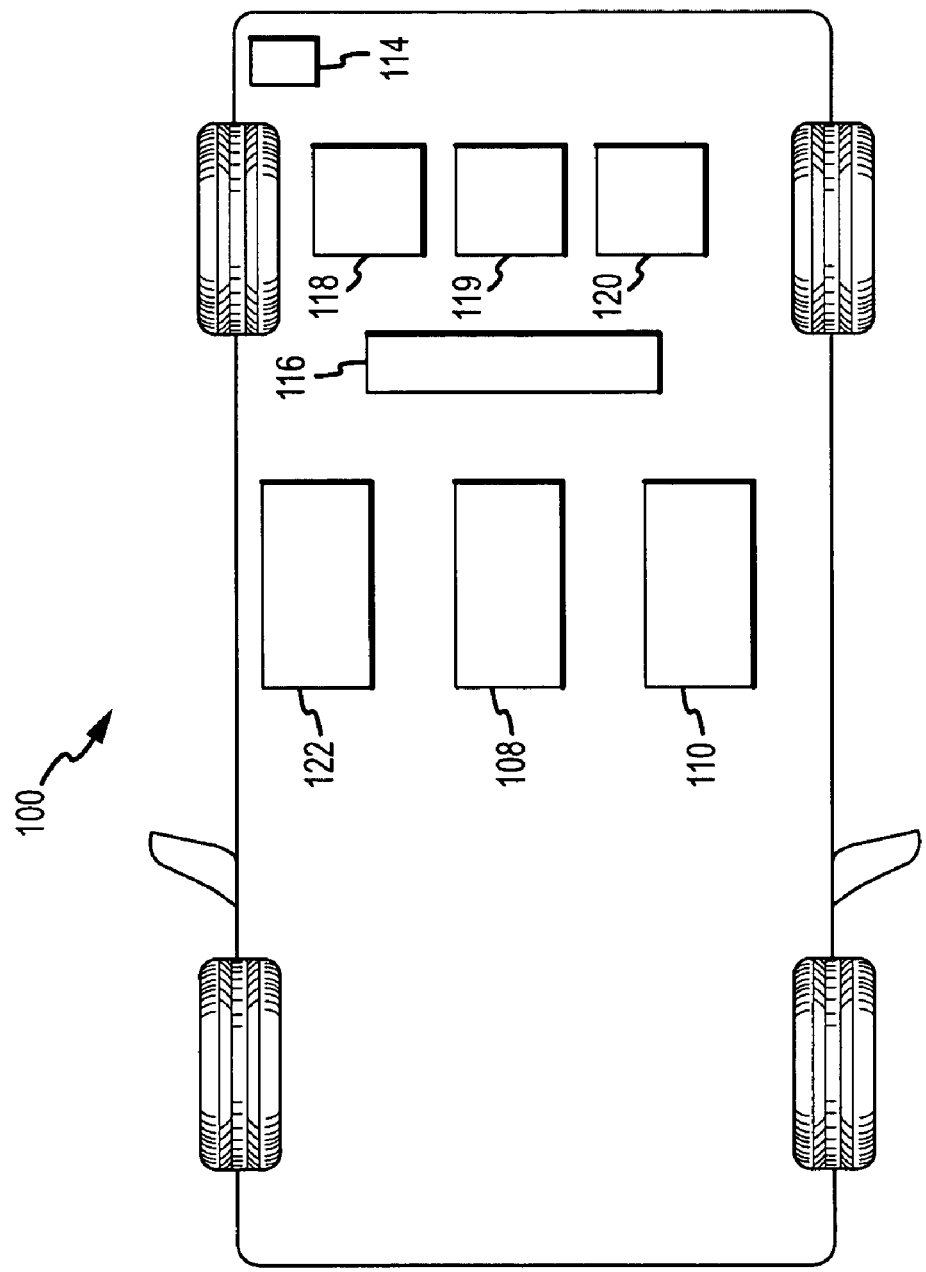
FIG. 1 is a schematic representation of an example embodiment of a plug-in electric vehicle that incorporates an embodiment of an inverter system.

FIG. 1 is a schematic representation of an example embodiment of a plug-in electric vehicle 100 that incorporates an embodiment of a power processing system, as described in more detail below. In the exemplary embodiment illustrated in FIG. 1, vehicle 100 is a plug-in fully electric vehicle or a plug-in hybrid electric vehicle having an electric traction system. According to various embodiments, the term "plug-in," as applied to a vehicle, means a vehicle having at least a DC energy source (e.g., DC energy source 110) and a hardware interface (e.g., AC power interface 114), where the hardware interface is adapted to connect with an external load (e.g., an electricity-consuming device) or a utility alternating current (AC) outlet in order to charge the DC energy source using power supplied by the electric utility.

Vehicle 100 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. Vehicle 100 may also incorporate any one of, or combination of, a number of different types of engines and/or traction systems, such as, for example, a gasoline or diesel fueled combustion engine, a "flex fuel vehicle" engine (i.e., using a mixture of gasoline and alcohol), a gaseous compound (e.g., hydrogen and natural gas) fueled engine, a combustion/electric motor hybrid engine, and an electric motor.

According to various embodiments, vehicle 100 includes one or more electronic control systems 108, one or more DC energy sources 110, one or more AC power interfaces 114, one or more inverter systems 116, and one or more motors 118, 119, 120. In embodiments in which vehicle 100 is a hybrid electric vehicle, vehicle 100 also may include an engine 122 (e.g., an internal combustion engine). Although only one each of electronic control system 108, DC energy source 110, AC power interface 114, and inverter system 116 is illustrated in FIG. 1, more than one (e.g., two or three) of any one or more of these components may be included in vehicle 100, in other embodiments. In addition, although three motors 118, 119, 120 are illustrated in FIG. 1, system 100 may include one, two, or more than three motors, in other embodiments.

In some embodiments, particularly in series-type hybrid electric vehicles, vehicle 100 may include a first motor 118 or "drive motor" adapted to provide drive power to wheels 106 through its electrical coupling with a traction system of the vehicle (e.g., to propel the vehicle), and a second motor 119 or "alternator" adapted to function as an alternator for cranking the internal combustion engine (or other type of engine) when starting and/or to provide additional mechanical power to the traction system for accelerating. In other embodiments, particularly in parallel-type hybrid electric vehicles, vehicle 100 may include a single motor 118 adapted to provide drive power and also to function as an alternator. In still other embodiments, particularly in power split-type hybrid electric vehicles (also referred to as series-parallel-type hybrid electric vehicles), vehicle 100 may include a first motor 118 adapted to provide drive power, a second motor 119 adapted to function as an alternator, and a third motor 120 adapted to function as an auxiliary motor (e.g., to provide power to an electric pump, AC compressor or other vehicle component).

In an embodiment, each motor 118-120 may include a three-phase alternating current (AC) electric motor, although other types of motors having a different number of phases may be employed. As shown in FIG. 1, motor 118 may also include or cooperate with a transmission such that motor 118 and the transmission are mechanically coupled to at least some of the vehicle's wheels through one or more drive shafts (not illustrated).

Electronic control system 108 is in operable communication with motors 118-120, DC energy source 110, and inverter system 116. Although not shown in detail, electronic control system 108 may include various sensors and automotive control modules, or electronic control units (ECUs) (e.g., an inverter control module and a vehicle controller), at least one processor, and/or a memory (or other computer-readable medium) which includes instructions stored thereon for carrying out the processes and methods as described below.

DC energy source 110 may include one or more rechargeable batteries, battery packs, fuel cells, supercapacitors, or the like. DC energy source 110 is in operable communication with and/or electrically coupled with electronic control system 108 and to inverter system 116. In embodiments in which vehicle 100 includes multiple DC energy sources 110, a first DC energy source 110 may have a first nominal operating voltage (e.g., in a range of 42 to 350 volts), and other DC energy sources may have different nominal operating voltages (e.g., in a range of 12 to 42 volts).

AC power interface 114 is in operable communication with and/or electrically coupled with inverter system 116. AC power interface 114 includes a hardware interface that is adapted to couple with an electric utility or other external load in order to exchange AC power with the electric utility or other external load. In an embodiment, AC power interface 114 includes a junction box (e.g., junction boxes 212, 312, 412, 512, 612, 712, FIGS. 2-7) that is adapted to receive an electrical plug (e.g., electrical plugs 290, 390, 490, 590, 690, 790, FIGS. 2-7) that is electrically coupled with or connectable to a utility AC outlet or an external load. In an alternate embodiment, AC power interface 114 includes an electrical plug that is adapted to be inserted into a junction box (e.g., an electrical socket, not illustrated), where the junction box is electrically coupled with or connectable to an electric utility or other external load. More particularly, in various embodiments, AC power interface 114 includes a hardware interface selected from a group of hardware interfaces that includes a two-conductor AC power interface, a three-conductor AC power interface, a single-phase junction box, a two-phase junction box, a three-phase junction box, a single-phase plug, a two-phase plug, and a three-phase plug. Embodiments described in conjunction with FIGS. 2-7, later, include vehicular power processing systems that include an AC power interface in the form of a junction box that is adapted to receive an electrical plug. The illustrated and described embodiments are not meant to be limiting, and it is to be understood that other embodiments of inverter systems may include an electrical plug that is adapted to be inserted into a junction box.

At various times, vehicle 100 may be in either a propulsion state or a parking state. In either state, various system components may interoperate as a vehicular power processing system (e.g., vehicular power processing systems 200, 300, 400, 500, 600, 700, FIGS. 2-7). More particularly, a vehicular power processing system may include one or more DC link capacitors (not illustrated), electronic control systems 108, DC energy sources 110, AC power interfaces 114, inverter systems 116, and motors 118-120, among other things. Various embodiments of vehicular power processing systems will be described later in conjunction with FIGS. 2-7.

While in the propulsion state, vehicle 100 may be stationary or moving, and the AC power interface 114 is disconnected from any electric utility or external load. In the propulsion state, the power processing system provides a drive function, in which inverter system 116 may draw DC power from DC energy source 110, convert the DC power to AC waveforms, and provide the AC waveforms to motors 118-120, in order to propel the vehicle, to provide alternator power, and/or to provide auxiliary power.

While in the parking state, vehicle 100 is stationary and the AC power interface 114 is coupled with an electric utility and/or another type of external load (e.g., via a physical coupling between a junction box and a plug). While in the vehicle parking state, vehicle 100 may be in either a charging mode or a power processing mode, according to various embodiments.

In the charging mode, the power processing system provides a charging function, in order to charge the vehicle's DC energy source 110 (e.g., a battery) by drawing power from an electric utility in order to recharge the DC energy source 110, according to an embodiment. Conversely, in the power processing mode, the power processing system functions to discharge the vehicle's DC energy source 110 by drawing power from the DC energy source 110, and supplying that power to the electric utility, according to another embodiment.

More specifically, when vehicle 100 is in the charging mode, inverter system 116 may provide a charging function by receiving AC power from the electric utility via one or more motors 118-120 and the AC power interface 114, converting the received AC power to DC power, and recharging DC energy source 110 with the DC power. Accordingly, vehicle 100 may function to recharge a DC energy source 110 while vehicle 100 is in the charging mode.

While in the power processing mode, and according to various embodiments, the system components (e.g., inverter system 116 and motor(s) 118-120) may be operable to provide any one or more functions selected from a group of functions that includes, but is not limited to, a stand-alone AC power source function, a utility-interconnected active power generator function, a utility-interconnected reactive power generator function, and/or a utility-interconnected active power filter function. Any one or more of these functions may be provided through control of the system components by an electronic control system 108. In other words, an electronic control system 108 may execute instructions that cause electronic control system 108 to supply control signals to the system components in a manner that causes the system components to provide one or more of the above functions.

According to various embodiments, when vehicle 100 in the power processing mode, inverter system 116 may operate to draw DC power from DC energy source 110, to convert the DC power to AC power, and to supply the AC power to an external load (e.g., an electric utility or another type of load) via one or more motors 118-120 and AC power interface 114. In addition, when vehicle 100 is in the power processing mode and is providing a utility-interconnected reactive power generator function, inverter system 116 also may operate to draw AC power from an electric utility via one or more motors 118-120 and AC power interface 114, to convert the AC power to DC power, and to provide the DC power to DC energy source 110. More detailed descriptions of the functioning of various system components will be given below, in conjunction with the descriptions of the power processing systems of FIGS. 2-7.

In an embodiment, vehicle 100 automatically may switch between the charging mode and the power processing mode based on various factors such as, for example, the state of charge (SOC) of the battery and/or the time of day. For example, vehicle 100 may be programmed not to switch to the power processing mode when the SOC of the battery is below a first threshold. As another example, vehicle 100 may be programmed automatically to switch from the power processing mode to the charging mode when the SOC of the battery is below a second threshold, which may be the same as or different from the first threshold. As yet another example, vehicle 100 may be programmed automatically to switch to the power processing mode at a first time of day (e.g., to supply power to a utility during a peak usage time period) and to switch to the charging mode at a second time of day (e.g., to draw power from the utility during a non-peak usage time period). In addition or alternatively, a user may cause vehicle 100 to switch to either the charging mode or the power processing mode by providing a user input through a user interface device that provides the user with the option to choose the mode.

Embodiments described in detail herein indicate that some or all of the same system components (e.g., inverter system 116, motor(s) 118-120, DC link capacitors (not illustrated)) may be used in both the propulsion state and the parking state in order to provide drive power to the vehicle's traction system, to charge the DC energy source 110 (e.g., in the charging mode), or to supply AC electric power (e.g., in the power processing mode). It is to be understood that, in other embodiments, vehicle 100 may include distinct system components for use in either the propulsion state or the parking state. Further, vehicle 100 may include distinct system components for use during either the charging mode or the power processing mode.

FIGS. 2-7 illustrate embodiments of power processing systems that are suitable for use in plug-in electric vehicles (e.g., vehicle 100, FIG. 1). The description of FIGS. 2-7, below, apply to configurations when a vehicle is in a parking state (e.g., the vehicle is stationary and the vehicle's AC power interface is coupled with an electric utility and/or another type of external load).

Figure 2:
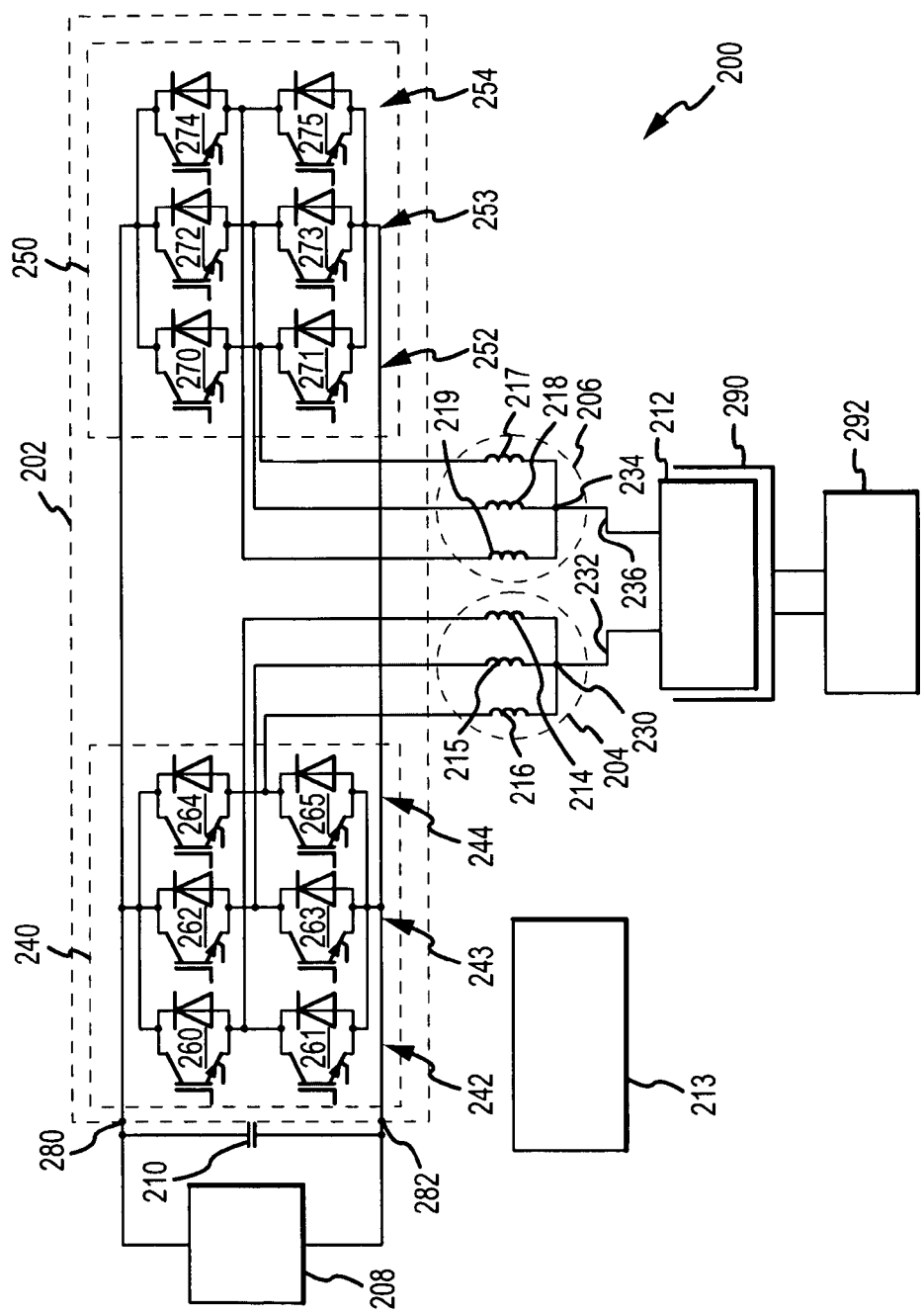
FIG. 2 is a schematic circuit representation of an embodiment of a vehicular power processing system, in accordance with a first example embodiment.

FIG. 2 is a schematic circuit representation of an embodiment of a vehicular power processing system 200, in accordance with a first example embodiment. System 200 may be suitable for use with a power split-type hybrid electric vehicle, although system 200 may be adapted for use with other types of hybrid electric vehicles, as well. In an embodiment, system 200 includes an inverter system 202 (e.g., inverter system 116, FIG. 1), a first AC electric motor 204 (e.g., a drive motor 118, FIG. 1), a second AC electric motor 206 (e.g., an alternator 119, FIG. 1), a rechargeable DC energy source 208 (e.g., DC energy source 110, FIG. 1), a DC bus capacitor 210, a junction box 212, and an electronic control system 213 (e.g., electronic control system 108, FIG. 1).

Inverter system 202 is operable as a bi-directional converter. When controlled to function as a DC-to-AC converter, inverter system 202 is adapted to convert DC power from DC energy source 208 into AC power for provision to first and second AC electric motors 204, 206. When controlled to function as an AC-to-DC converter, inverter system 202 is adapted to convert AC power from first and second AC electric motors 204, 206 into DC power for provision to DC energy source 208.

Inverter system 202 includes a first inverter section 240 and a second inverter section 250. In an embodiment, inverter section 240 includes an array of six switches 260, 261, 262, 263, 264, 265 and inverter section 250 includes an array of six switches 270, 271, 272, 273, 274, 275. Switches 260, 262, 264, 270, 272, 274 may be referred to as "upper switches," and switches 261, 263, 265, 271, 273, 275 may be referred to as lower switches. Each switch 260-265, 270-275 includes a transistor (e.g., an insulated gate bipolar transistor (IGBT), metal oxide semiconductor field effect transistor (MOSFET), integrated gate commutated thyristor (IGCTs) or other high frequency switching device) and an antiparallel diode. During operation, the direction of current through the transistor is opposite to the direction of allowable current through the respective diode. During operation, an inverter control algorithm executed by electronic control system 213 provides drive signals (not illustrated) to the transistors of each of the switches 260-265, 270-275, where the drive signals have characteristics that depend on the function being implemented by system 200 at the time (e.g., drive function, charging function, stand-alone AC power source function, utility-interconnected active power generator function, utility-interconnected reactive power generator function, or utility-interconnected active power filter function). In an embodiment, the transistor drive signals include high frequency pulse width modulated (PWM) signals having variable characteristics (e.g., duty cycle) that may be adjusted to control the switching of switches 260-265, 270-275, and thus to control the voltage and current produced by inverter sections 240 and 250 (e.g., to produce a desired voltage and/or current amplitude and/or phase shift).

As shown, pairs of switches 260-265 in inverter section 240 are electrically coupled in series with each other, and each pair comprises a switching leg 242, 243, and 244. The switching legs 242-244 are electrically coupled in parallel with each other. Similarly, pairs of switches 270-275 in inverter section 250 are electrically coupled in series with each other, and each pair comprises a switching leg 252, 253, and 254. The switching legs 252-254 are electrically coupled in parallel with each other. Conductive components at first ends of switching legs 242-244 and 252-254 are electrically coupled with a first inverter terminal 280, and conductive components at second, opposite ends of switching legs 242-244 and 252-254 are electrically coupled with a second inverter terminal 282.

Rechargeable DC energy source 208 is electrically coupled in parallel with inverter system 202 across first inverter terminal 280 and second inverter terminal 282. Rechargeable DC energy source 208 may include one or more rechargeable batteries, battery packs, supercapacitors, or the like. In addition, DC bus capacitor 210 is electrically coupled across rechargeable DC energy source 208, and thus also is coupled in parallel with inverter system 202 across first inverter terminal 280 and second inverter terminal 282. DC bus capacitor 210 is adapted to provide DC bus voltage filtering. In various embodiments, DC bus capacitor 210 may include one or more electrolytic capacitors, film capacitors, or other types of capacitors.

Each of AC electric motors 204, 206 is a three phase motor that includes a set of three windings (or coils) 214, 215, 216, 217, 218, 219. Although not illustrated, AC electric motors 204, 206 each include a stator assembly (including the windings) and a rotor assembly (including a ferromagnetic core, windings, and/or permanent magnets). The windings 214-216 of first AC electric motor 204 are electrically coupled with first inverter section 240 as follows: 1) a first winding 214 is electrically coupled with a connection point between the switches of leg 242; 2) a second winding 215 is electrically coupled with a connection point between the switches of leg 243; and 3) a third winding 216 is electrically coupled with a connection point between the switches of leg 244. Similarly, the windings 217-219 of second AC electric motor 206 are electrically coupled with second inverter section 250 as follows: 1) a first winding 217 is electrically coupled with a connection point between the switches of leg 252; 2) a second winding 218 is electrically coupled with a connection point between the switches of leg 253; and 3) a third winding 219 is electrically coupled with a connection point between the switches of leg 254.

Junction box 212 is adapted to receive and electrically couple with a single-phase or two-phase electrical plug 290, which in turn is electrically coupled with an external load 292 (e.g., a device or an electric utility). In an alternate embodiment, system 200 may include a single-phase or two-phase electrical plug (not illustrated), in place of junction box 212. In such an embodiment, the electrical plug may be adapted to be received by and electrically couple with an external junction box (not illustrated). The junction box, in turn, may be electrically coupled with an external load (e.g., a device or an electric utility). In either embodiment (e.g., when system 200 includes either a junction box or a plug), the junction box or plug of the vehicle more generally may be considered a two-conductor AC power interface (e.g., AC power interface 114, FIG. 1).

In an embodiment, a neutral point 230 of first AC electric motor 204 may be electrically coupled with a first conductor 232 between first AC electric motor 204 and junction box 212. Similarly, a neutral point 234 of second AC electric motor 206 may be electrically coupled with a second conductor 236 between second AC electric motor 206 and junction box 212. When system 200 is adapted to process single-phase AC power, first conductor 232 may carry a phase component of the AC power, and second conductor 236 may carry a neutral component of the AC power, or vice versa. When system 200 is adapted to process two-phase AC power, first conductor 232 may carry a first phase component of the AC power, and second conductor 236 may carry a second phase component of the AC power.

When system 200 is in a propulsion state, junction box 212 typically is disconnected from plug 290, in order to enable the vehicle to move. In addition, to provide a drive function, electronic control system 213 may provide transistor drive signals to inverter system 202, which cause inverter system 202 to draw DC power from DC energy source 208, to convert the DC power to AC power, and to provide the AC power to motors 204, 206, in order to propel the vehicle and/or to provide alternator power. Referring to first inverter section 240, in an embodiment, electronic control system 213 provides the transistor drive signals to switch the upper switches 260, 262, 264 out of phase with each other (e.g., 120 degrees out of phase with each other), and to switch each of the lower switches 261, 263, 265 out of phase with each other and also out of phase (e.g., 180 degrees out of phase) with the switching cycles of the corresponding upper switches 260, 262, 264 within each leg 242, 243, 244. The corresponding switches (e.g., switches in the same position in the six switch array, such as switches 260 and 270) of the first inverter section 240 and the second inverter section 250 may or may not be switched synchronously with each other.

When system 200 is in a parking state, junction box 212 is connected to plug 290, and thus to external load 292 (e.g., a device or an electric utility). When system 200 is in the parking state and additionally is in a charging mode, a charging function may be provided when electronic control system 213 provides transistor drive signals to inverter system 202, which cause inverter system 202 to draw AC power from motors 204, 206, to convert the AC power to DC power, and to provide the DC power to DC energy source 208, in order to recharge DC energy source 208. Referring to first inverter section 240, in an embodiment, electronic control system 213 provides the transistor drive signals to switch the upper switches 260, 262, 264, in phase with each other (e.g., the switching cycles are synchronized), and to switch each of the lower switches 261, 263, 265, in phase with each other but out of phase (e.g., 180 degrees out of phase) with the switching cycles of the corresponding upper switches 260, 262, 264 within each leg 242, 243, 244. In either single-phase operation or two-phase operation, a first group of switches that includes the upper switches of each leg of first inverter section 240 (e.g., switches 260, 262, 264) and the lower switches of each leg of second inverter section 250 (e.g., switches 271, 273, 275) are synchronously switched. In other words, all six switches of the first group of switches are turned on or off simultaneously. Similarly, a second group of switches that includes the lower switches of each leg of first inverter section 240 (e.g., switches 261, 263, 265) and the upper switches of each leg of second inverter section 250 (e.g., switches 270, 272, 274) are synchronously switched. In other words, all six switches of the second group of switches are turned on or off simultaneously. Switching of the first group of six switches is 180 degrees out of phase with the switching of the second group of six switches.

Alternatively, when system 200 is in a parking state and additionally is in a power processing mode, one or more of a variety of functions may be provided in accordance with the transistor drive signals provided by electronic control system 213. In a particular embodiment, and as mentioned previously, the functions that may be provided in the parking state and the power processing mode may include any one or more functions selected from a group of functions that includes, but is not limited to, a stand-alone AC power source function, a utility-interconnected active power generator function, a utility-interconnected reactive power generator function, and/or a utility-interconnected active power filter function. For the functions listed in the previous sentence, control of switches 260-265 of first inverter section 240 and second inverter section 250 may be performed in a similar manner as the control of switches 260-265 of first inverter section 240 and second inverter section 250 in charging mode. In other words, referring to first inverter section 240, electronic control system 213 provides the transistor drive signals to switch the upper switches 260, 262, 264 in phase with each other, and to switch each of the lower switches 261, 263, 265 in phase with each other but out of phase with the switching cycles of the corresponding upper switches 260, 262, 264 within each leg 242, 243, 244, in an embodiment. In addition, the corresponding switches of second inverter section 250 are switched synchronously with the corresponding switches of first inverter section 240.

The stand-alone AC power source function may be provided, for example, when system 200 is in operable communication with and/or electrically coupled with an external load 292 in the form of a device (e.g., a device that operates using 120 or 240 AC volts) via junction box 212 and plug 290. To provide the AC power source function, electronic control system 213 provides transistor drive signals to inverter system 202, which cause inverter system 202 to draw DC power from DC energy source 208, to convert the DC power to AC power, and to supply the AC power to external load 292 via the windings 214-219 of motors 204, 206, junction box 212, and plug 290.

The utility-interconnected active power generator function, utility-interconnected reactive power generator function, and/or utility-interconnected active power filter function may be provided, for example, when system 200 is in operable communication with and/or electrically coupled with an external load 292 in the form of an electric utility via junction box 212 and plug 290. To provide the utility-interconnected active power generator function, electronic control system 213 provides transistor drive signals to inverter system 202, which causes inverter system 202 to draw DC power from DC energy source 208, to convert the DC power to AC power, and to supply the AC power to the external load 292 (e.g., the electric utility) via the windings 214-219 of motors 204, 206, junction box 212, and plug 290. In order to control the quantity of active power supplied by system 200 to the electric utility, the magnitude of the AC power may be adjusted through adjustment of the characteristics of the transistor drive signals provided by electronic control system 213 to inverter system 202 (e.g., the magnitude of the AC power is increased to supply more active power to the utility and decreased to supply less active power to the utility).

To provide the utility-interconnected reactive power generator function, electronic control system 213 provides transistor drive signals to inverter system 202 during a first half of an electric cycle, which cause inverter system 202 to draw DC power from DC energy source 208, to convert the DC power to AC power, and to supply the AC power to the external load 292 (e.g., the electric utility) via the windings 214-219 of motors 204, 206, junction box 212, and plug 290. During a second half of the electric cycle, electronic control system 213 provides transistor drive signals to inverter system 202, which cause inverter system 202 to draw AC power from the external load 292 (e.g., the electric utility) via the windings 214-219 of motors 204, 206, junction box 212, and plug 290, to convert the AC power to DC power, and to supply the DC power to the DC energy source 208. In order to control the quantity of reactive power circulated by system 200 between itself and the electric utility, the phase shift between the voltage and current waveforms of the AC power may be adjusted through adjustment of the characteristics of the transistor drive signals provided by electronic control system 213 to inverter system 202 (e.g., the phase shift may be increased toward 90 degrees to supply more reactive power to the utility and decreased toward 0 degrees to supply less reactive power to the utility).

Finally, to provide the utility-interconnected power filter function, electronic control system 213 provides transistor drive signals to inverter system 202, which cause inverter system 202 to draw DC power from DC energy source 208, to convert the DC power to AC power, and to supply the AC power to the external load 292 (e.g., the electric utility) via the windings 214-219 of motors 204, 206, junction box 212, and plug 290 in an effort to help the electric utility to create more sinusoidal voltage/current waveforms.

Figure 3:
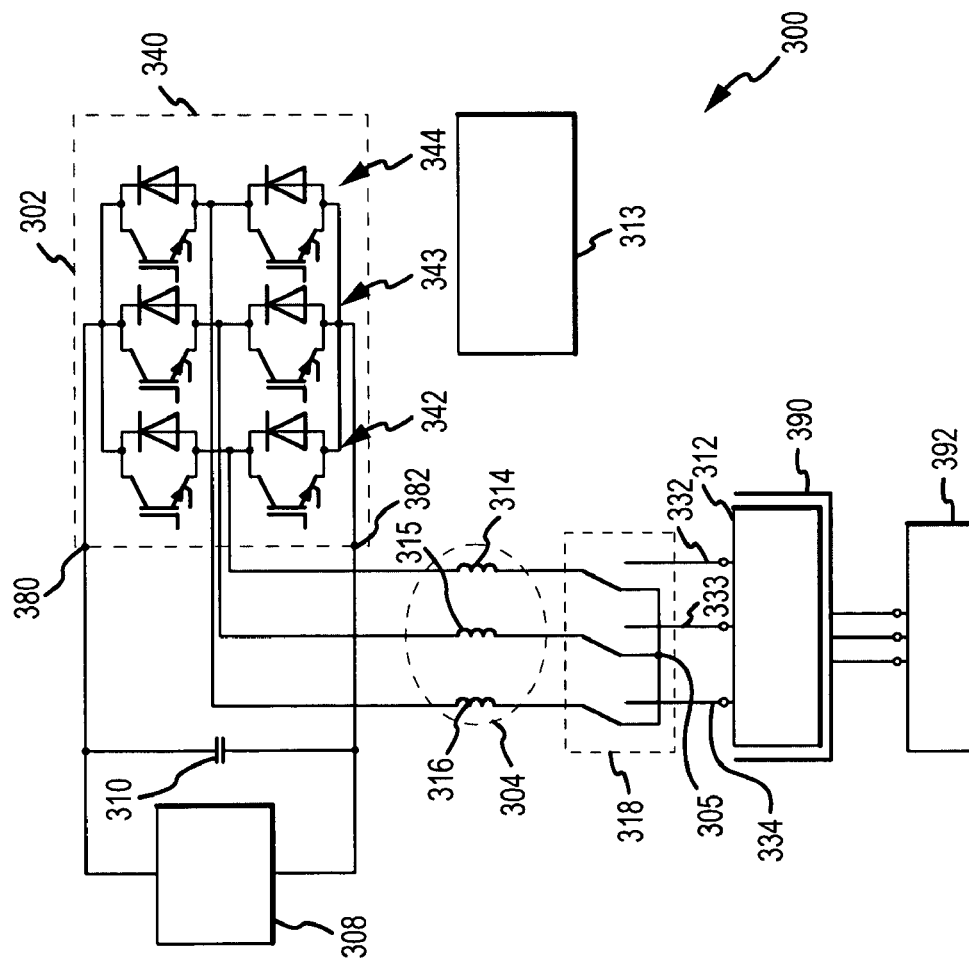
FIG. 3 is a schematic circuit representation of an embodiment of a vehicular power processing system, in accordance with a second example embodiment.

FIG. 3 is a schematic circuit representation of an embodiment of a vehicular power processing system 300, in accordance with a second example embodiment. System 300 may be suitable for use with a parallel-type hybrid electric vehicle, although system 300 may be adapted for use with other types of hybrid electric vehicles, as well. In an embodiment, system 300 includes an inverter system 302 (e.g., inverter system 116, FIG. 1), an AC electric motor 304 (e.g., motor 118, 119 or 120, FIG. 1), a rechargeable DC energy source 308 (e.g., DC energy source 110, FIG. 1), a DC bus capacitor 310, a junction box 312, an electronic control system 313 (e.g., electronic control system 108, FIG. 1), and a switch array 318. The functions and various embodiments relating to DC energy source 308 and DC bus capacitor 310 are similar to the functions and various embodiments of analogous components in FIG. 2 (e.g., DC energy source 208 and DC bus capacitor 310), and accordingly are not repeated here for purposes of brevity.

Inverter system 302 is operable as a bi-directional converter, as described in conjunction with FIG. 2, and includes an inverter section 340. In an embodiment, inverter section 340 includes an array of six switches, which may be configured in the same manner and function the same as embodiments of switches 260-265, discussed above in conjunction with FIG. 2. In addition, during operation, an inverter control algorithm executed by an electronic control system 313 provides transistor drive signals (not illustrated) depending on the function being implemented by system 300 at the time, as also discussed above in conjunction with FIG. 2. To provide a drive function or to provide a charging function, the switches of inverter section 340 may be controlled in substantially the same manner as described above when switches 260-265 (FIG. 2) are controlled to provide a drive function. Otherwise, to provide a utility-interconnected active power generator function, a utility-interconnected reactive power generator function, and/or a utility-interconnected active power filter function, the switches of inverter section 340 may be controlled in substantially the same manner as described above when switches 260-265 (FIG. 2) are controlled to provide the corresponding functions.

As shown, pairs of switches in inverter section 340 are electrically coupled in series with each other, and each pair comprises a switching leg 342, 343, and 344. The switching legs 342-344 are electrically coupled in parallel with each other. Conductive components at first ends of switching legs 342-344 are electrically coupled with a first inverter terminal 380, and conductive components at second, opposite ends of switching legs 342-344 are electrically coupled with a second inverter terminal 382.

Rechargeable DC energy source 308 is electrically coupled in parallel with inverter system 302 across first inverter terminal 380 and second inverter terminal 382. In addition, DC bus capacitor 310 is electrically coupled across rechargeable DC energy source 308, and thus also is coupled in parallel with inverter system 302 across first inverter terminal 380 and second inverter terminal 382.

In contrast with junction box 212 of FIG. 2, junction box 312 is adapted to receive and electrically couple with a three-phase electrical plug 390, which in turn is electrically coupled with an external load 392 (e.g., a device or an electric utility). In an alternate embodiment, system 300 may include a three-phase electrical plug (not illustrated), in place of junction box 312, as described above in conjunction with FIG. 2. In either embodiment (e.g., when system 200 includes either a junction box or a plug), the junction box or plug of the vehicle more generally may be considered a three-conductor AC power interface (e.g., AC power interface 114, FIG. 1).

AC electric motor 304 is a three phase motor that includes a set of three windings (or coils) 314, 315, 316. Although not illustrated, AC electric motor 304 includes a stator assembly (including the windings) and a rotor assembly (including a ferromagnetic core, windings, and/or permanent magnets). The windings 314-316 of AC electric motor 204 are electrically coupled with inverter section 340 as follows: 1) a first end of winding 314 is electrically coupled with a connection point between the switches of leg 342; 2) a first end of second winding 315 is electrically coupled with a connection point between the switches of leg 343; and 3) a first end of third winding 316 is electrically coupled with a connection point between the switches of leg 344.

In an embodiment, switch array 318 includes three solid state switches in the form of three back-to-back silicon controlled rectifiers (SCR). The windings 314-316 of AC electric motor 204 are electrically coupled with switch array 318 as follows: 1) a second end of winding 314 is electrically coupled with a first switch of switch array 318; 2) a second end of second winding 315 is electrically coupled with a second switch of switch array 318; and 3) a second end of third winding 316 is electrically coupled with a third switch of switch array 318.

A neutral point 305 of AC electric motor 304 is separated, in an embodiment, by switch array 318. In an embodiment, switch array 318 includes three switches, arranged in parallel. Each switch of switch array 318 may be controlled into a first position (as shown in FIG. 3) or a second position. In an embodiment, the position of the switches in switch array 318 may be controlled by a coordinating circuit (not illustrated) within system 300 according to whether or not plug 390 is inserted into junction box 312. When plug 390 is not inserted into junction box 312, the switches of switch array 318 may be controlled to remain in the first position. When plug 390 is inserted into the junction box 312, the switches of switch array 318 may be controlled to remain in the second position, in an embodiment.

In the first position, the second ends of windings 314, 315, 316 are disconnected from junction box 312, and are interconnected to form the neutral point 305. In an embodiment, the switches of switch array 318 may be controlled into the first position in the propulsion state, for example. In the second position, the second end of each winding 314, 315, 316 is electrically coupled with one of the three conductors 332, 333, 334 between junction box 312 and switch array 318. Accordingly, when the switches of switch array 318 are in the second position, first conductor 332 may carry a first phase component of the AC power, second conductor 333 may carry a second phase component of the AC power, and third conductor 334 may carry a third phase component of the AC power. In an embodiment, the switches of switch array 318 may be controlled into the second position in the parking state, for example, in order to interconnect system 300 with external load 392 via junction box 312, and to enable system 300 to provide the charging function, the utility-interconnected active power generator function, the utility-interconnected reactive power generator function, and/or the utility-interconnected active power filter function.

Figure 4:
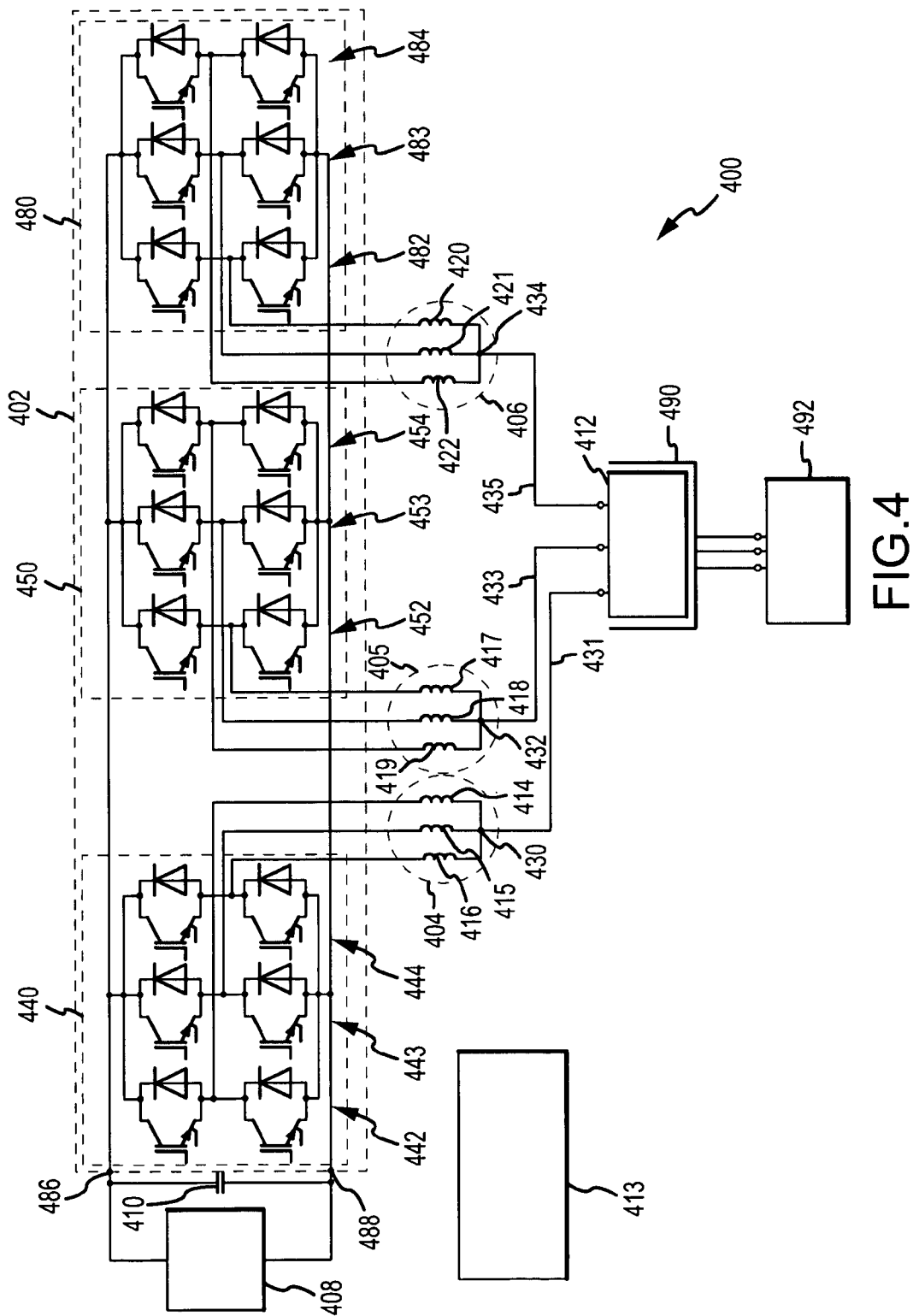
FIG. 4 is a schematic circuit representation of an embodiment of a vehicular power processing system, in accordance with a third example embodiment.

FIG. 4 is a schematic circuit representation of an embodiment of a vehicular power processing system 400, in accordance with a third example embodiment. System 400 may be suitable for use with a power split-type hybrid electric vehicle, although system 400 may be adapted for use with other types of hybrid electric vehicles, as well. In an embodiment, system 400 includes an inverter system 402 (e.g., inverter system 116, FIG. 1), a first AC electric motor 404 (e.g., a drive motor 118, FIG. 1), a second AC electric motor 405 (e.g., an alternator 119, FIG. 1), a third AC electric motor 406 (e.g., an auxiliary motor 120, FIG. 1), a rechargeable DC energy source 408 (e.g., DC energy source 110, FIG. 1), a DC bus capacitor 410, a junction box 412, and an electronic control system 413 (e.g., electronic control system 108, FIG. 1). The functions and various embodiments relating to DC energy source 408 and DC bus capacitor 410 are similar to the functions and various embodiments of analogous components in FIG. 2 (e.g., DC energy source 208 and DC bus capacitor 310), and accordingly are not repeated here for purposes of brevity.

Inverter system 402 is operable as a bi-directional converter, as described in conjunction with FIG. 2, and includes a first inverter section 440, a second inverter section 450, and a third inverter section 480. In an embodiment, inverter sections 440, 450, 480 each include an array of six switches, which may be configured in the same manner and function the same as embodiments of switches 260-265, discussed above in conjunction with FIG. 2. In an embodiment, however, the switches of first and second inverter sections 440, 450 may be adapted for high power applications (e.g., as they may be electrically coupled with a drive motor 404 and an alternator motor 405, respectively), and the switches of third inverter section 480 may be adapted for significantly lower power applications (e.g., as they may be electrically coupled with an auxiliary motor 406). In addition, during operation, an inverter control algorithm executed by electronic control system 413 provides transistor drive signals (not illustrated) depending on the function being implemented by system 400 at the time, as also discussed above in conjunction with FIG. 2. In an embodiment, through control of the switching of the first, second, and third inverter sections 440, 450, 480, motors 404-406 are operated out of phase with each other (e.g., 120 degrees out of phase).

As shown, pairs of switches in inverter section 440 are electrically coupled in series with each other, and each pair comprises a switching leg 442, 443, and 444. The switching legs 442-444 are electrically coupled in parallel with each other. Similarly, pairs of switches in inverter section 450 are electrically coupled in series with each other, and each pair comprises a switching leg 452, 453, and 454. The switching legs 452-454 are electrically coupled in parallel with each other. Finally, pairs of switches in inverter section 480 are electrically coupled in series with each other, and each pair comprises a switching leg 482, 483, and 484. The switching legs 482-484 are electrically coupled in parallel with each other. Conductive components at first ends of switching legs 442-444, 452-454, and 482-484 are electrically coupled with a first inverter terminal 486, and conductive components at second, opposite ends of switching legs 442-444, 452-454, and 482-484 are electrically coupled with a second inverter terminal 488.

Rechargeable DC energy source 408 is electrically coupled in parallel with inverter system 402 across first inverter terminal 486 and second inverter terminal 488. In addition, DC bus capacitor 410 is electrically coupled across rechargeable DC energy source 408, and thus also is coupled in parallel with inverter system 402 across first inverter terminal 486 and second inverter terminal 488.

Similar to junction box 312 of FIG. 3, junction box 412 is adapted to receive and electrically couple with a three-phase electrical plug 490, which in turn is electrically coupled with an external load 392 (e.g., a device or an electric utility). In an alternate embodiment, system 400 may include a three-phase electrical plug (not illustrated), in place of junction box 412, as described above in conjunction with FIG. 2. In either embodiment (e.g., when system 200 includes either a junction box or a plug), the junction box or plug of the vehicle more generally may be considered a three-conductor AC power interface (e.g., AC power interface 114, FIG. 1).

Each of AC electric motors 404-406 is a three phase motor that includes a set of three windings (or coils) 414, 415, 416, 417, 418, 419, 420, 421, 422. Although not illustrated, AC electric motors 404-406 each include a stator assembly (including the windings) and a rotor assembly (including a ferromagnetic core, windings, and/or permanent magnets). The windings 414-416 of first AC electric motor 404 are electrically coupled with first inverter section 440 as follows: 1) a first winding 414 is electrically coupled with a connection point between the switches of leg 442; 2) a second winding 415 is electrically coupled with a connection point between the switches of leg 443; and 3) a third winding 416 is electrically coupled with a connection point between the switches of leg 444. Similarly, the windings 417-419 of second AC electric motor 405 are electrically coupled with second inverter section 450 as follows: 1) a first winding 417 is electrically coupled with a connection point between the switches of leg 452; 2) a second winding 418 is electrically coupled with a connection point between the switches of leg 453; and 3) a third winding 419 is electrically coupled with a connection point between the switches of leg 454. Finally, the windings 420-422 of third AC electric motor 406 are electrically coupled with third inverter section 480 as follows: 1) a first winding 420 is electrically coupled with a connection point between the switches of leg 482; 2) a second winding 421 is electrically coupled with a connection point between the switches of leg 483; and 3) a third winding 422 is electrically coupled with a connection point between the switches of leg 484.

In an embodiment, a neutral point 430 of first AC electric motor 404 may be electrically coupled with a first conductor 431 between first AC electric motor 404 and junction box 412. Similarly, a neutral point 432 of second AC electric motor 405 may be electrically coupled with a second conductor 433 between second AC electric motor 405 and junction box 412. Finally, a neutral point 434 of third AC electric motor 406 may be electrically coupled with a third conductor 435 between third AC electric motor 406 and junction box 412.

As mentioned previously, through control of the switching of the first, second, and third inverter sections 440, 450, 480, motors 404-406 are operated out of phase with each other (e.g., 120 degrees out of phase). Accordingly, first conductor 431 may carry a first phase component of the AC power, second conductor 433 may carry a second phase component of the AC power, and third conductor 435 may carry a third phase component of the AC power. In an embodiment, the phase components of the AC power are limited by the capacity of inverter section 480, which may include relatively low-power switches, as described previously.

Figure 5:
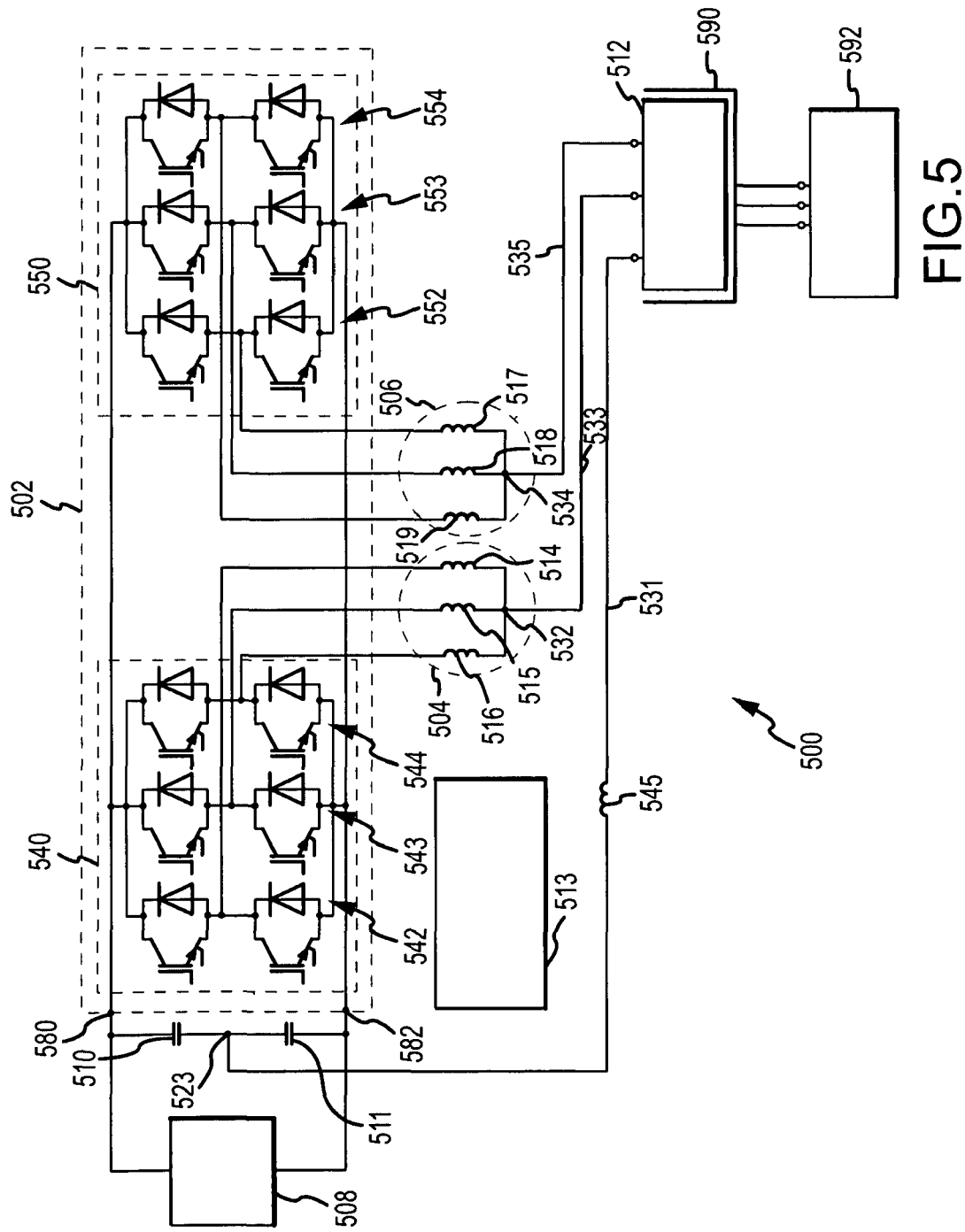
FIG. 5 is a schematic circuit representation of an embodiment of a vehicular power processing system, in accordance with a fourth example embodiment.

FIG. 5 is a schematic circuit representation of an embodiment of a vehicular power processing system 500, in accordance with a fourth example embodiment. System 500 may be suitable for use with a series-type hybrid electric vehicle or a power split-type hybrid electric vehicle, although system 500 may be adapted for use with other types of hybrid electric vehicles, as well. In an embodiment, system 500 includes an inverter system 502 (e.g., inverter system 116, FIG. 1), a first AC electric motor 504 (e.g., a drive motor 118, FIG. 1), a second AC electric motor 506 (e.g., an alternator 119, FIG. 1), a rechargeable DC energy source 508 (e.g., DC energy source 110, FIG. 1), a plurality of DC bus capacitors 510, 511, a junction box 512, an electronic control system 513 (e.g., electronic control system 108, FIG. 1), and an inductor 545. The functions and various embodiments relating to DC energy source 508 are similar to the functions and various embodiments of analogous components in FIG. 2 (e.g., DC energy source 208), and accordingly are not repeated here for purposes of brevity.

Inverter system 502 is operable as a bi-directional converter, as described in conjunction with FIG. 2, and includes a first inverter section 540 and a second inverter section 550. In an embodiment, inverter sections 540, 550 each include an array of six switches, which may be configured in the same manner and function the same as embodiments of switches 260-265, discussed above in conjunction with FIG. 2. In addition, during operation, an inverter control algorithm executed by electronic control system 513 provides transistor drive signals (not illustrated) depending on the function being implemented by system 500 at the time, as also discussed above in conjunction with FIG. 2. In an embodiment, through control of the switching of the first and second inverter sections 540, 550, motors 504, 506 are operated out of phase with each other (e.g., 120 degrees out of phase).

As shown, pairs of switches in inverter section 540 are electrically coupled in series with each other, and each pair comprises a switching leg 542, 543, and 544. The switching legs 542-544 are electrically coupled in parallel with each other. Similarly, pairs of switches in inverter section 550 are electrically coupled in series with each other, and each pair comprises a switching leg 552, 553, and 554. The switching legs 552-554 are electrically coupled in parallel with each other. Conductive components at first ends of switching legs 542-544 and 552-554 are electrically coupled with a first inverter terminal 580, and conductive components at second, opposite ends of switching legs 542-544 and 552-554 are electrically coupled with a second inverter terminal 582.

Rechargeable DC energy source 508 is electrically coupled in parallel with inverter system 502 across first inverter terminal 580 and second inverter terminal 582. In an embodiment, DC bus capacitors 510, 511 include two series connected capacitors 510, 511, although system 500 may include more than two series connected capacitors, in other embodiments. In addition, the ends of the series connected DC bus capacitors 510, 511 are electrically coupled across rechargeable DC energy source 508, and thus also are coupled in parallel with inverter system 502 across first inverter terminal 580 and second inverter terminal 582.

Similar to junction box 312 of FIG. 3, junction box 512 is adapted to receive and electrically couple with a three-phase electrical plug 590, which in turn is electrically coupled with an external load 592 (e.g., a device or an electric utility). In an alternate embodiment, system 500 may include a three-phase electrical plug (not illustrated), in place of junction box 512, as described above in conjunction with FIG. 2. In either embodiment (e.g., when system 200 includes either a junction box or a plug), the junction box or plug of the vehicle more generally may be considered a three-conductor AC power interface (e.g., AC power interface 114, FIG. 1).

Each of AC electric motors 504, 506 is a three phase motor that includes a set of three windings (or coils) 514, 515, 516, 517, 518, 519. Although not illustrated, AC electric motors 504, 506 each includes a stator assembly (including the windings) and a rotor assembly (including a ferromagnetic core, windings, and/or permanent magnets). The windings 514-516 of first AC electric motor 504 are electrically coupled with first inverter section 540 as follows: 1) a first winding 514 is electrically coupled with a connection point between the switches of leg 542; 2) a second winding 515 is electrically coupled with a connection point between the switches of leg 543; and 3) a third winding 516 is electrically coupled with a connection point between the switches of leg 544. Similarly, the windings 517-519 of second AC electric motor 506 are electrically coupled with second inverter section 550 as follows: 1) a first winding 517 is electrically coupled with a connection point between the switches of leg 552; 2) a second winding 518 is electrically coupled with a connection point between the switches of leg 553; and 3) a third winding 519 is electrically coupled with a connection point between the switches of leg 554.

A neutral point 532 of first AC electric motor 504 may be electrically coupled with a second conductor 533 between first AC electric motor 504 and junction box 512. Similarly, a neutral point 534 of second AC electric motor 506 may be electrically coupled with a third conductor 535 between second AC electric motor 506 and junction box 512.

In an embodiment, a connection point 523 (e.g., a midpoint, electrically) between DC bus capacitors 510, 511 is electrically coupled with a first end of inductor 545, and a second end of inductor 545 is electrically coupled with a first conductor 531 between inductor 545 and junction box 512. Inductor 545 may include, for example, an inductor element adapted to provide current regulation for the current drawn from connection point 523.

As mentioned previously, through control of the switching of the first and second inverter sections 540, 550, motors 504, 506 are operated out of phase with each other (e.g., 120 degrees out of phase). In addition, when system 500 is a balanced, three-phase system, according to an embodiment, the phase of the current at the connection point 523 between DC bus capacitors 510, 511 is indirectly controlled by directly controlling the phases of the currents through motors 504, 506. For example, when the first and second inverter sections 540, 550 are controlled so that the currents at the neutral points 532, 534 are 120 degrees out of phase with each other, the current at the connection point 523 between DC bus capacitors 510, 511 also will be 120 degrees out of phase with the motor currents. Accordingly, with the above-described couplings between the various system components, first conductor 532 may carry a first phase component of the AC power (e.g., from connection point 523), second conductor 533 may carry a second phase component of the AC power (e.g., from neutral point 532), and third conductor 534 may carry a third phase component of the AC power (e.g., from neutral point 534).

Figure 6:
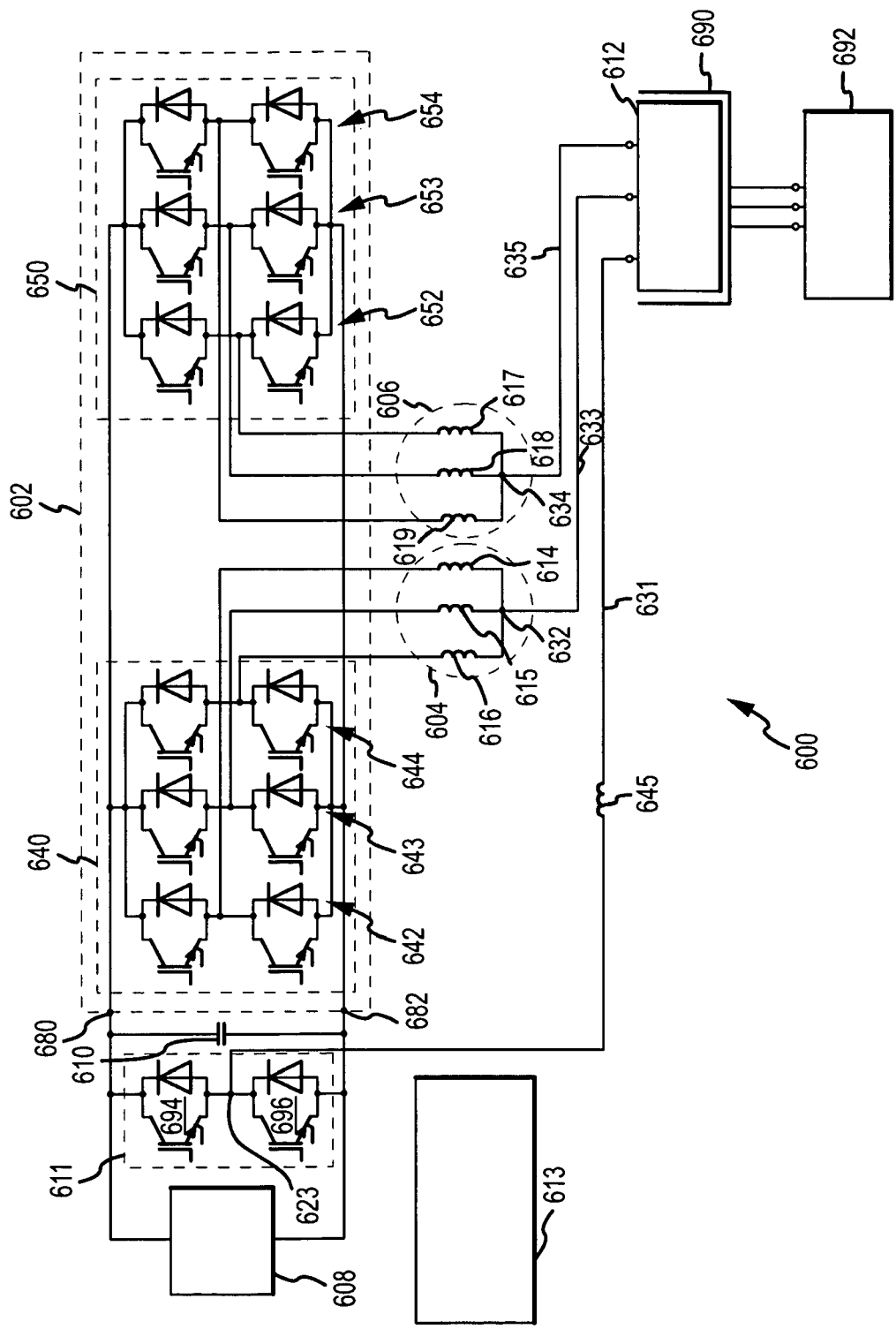
FIG. 6 is a schematic circuit representation of an embodiment of a vehicular power processing system, in accordance with a fifth example embodiment.

FIG. 6 is a schematic circuit representation of an embodiment of a vehicular power processing system 600, in accordance with a fifth example embodiment. System 600 may be suitable for use with a series-type hybrid electric vehicle or a power split-type hybrid electric vehicle, although system 600 may be adapted for use with other types of hybrid electric vehicles, as well. In an embodiment, system 600 includes an inverter system 602 (e.g., inverter system 116, FIG. 1), a first AC electric motor 604 (e.g., a drive motor 118, FIG. 1), a second AC electric motor 606 (e.g., an alternator 119, FIG. 1), a rechargeable DC energy source 608 (e.g., DC energy source 110, FIG. 1), a DC bus capacitor 610, a half bridge 611, an inductor 645, a junction box 612, and an electronic control system 613 (e.g., electronic control system 108, FIG. 1). The functions and various embodiments relating to DC energy source 608 and DC bus capacitor 610 are similar to the functions and various embodiments of analogous components in FIG. 2 (e.g., DC energy source 208 and DC bus capacitor 210), and accordingly are not repeated here for purposes of brevity.

Inverter system 602 is operable as a bi-directional converter, as described in conjunction with FIG. 2, and includes a first inverter section 640 and a second inverter section 650. In an embodiment, inverter sections 640, 650 each include an array of six switches, which may be configured in the same manner and function the same as embodiments of switches 260-265, discussed above in conjunction with FIG. 2. In addition, during operation, an inverter control algorithm executed by electronic control system 613 provides transistor drive signals (not illustrated) depending on the function being implemented by system 600 at the time, as also discussed above in conjunction with FIG. 2.

As shown, pairs of switches in inverter section 640 are electrically coupled in series with each other, and each pair comprises a switching leg 642, 643, and 644. The switching legs 642-644 are electrically coupled in parallel with each other. Similarly, pairs of switches in inverter section 650 are electrically coupled in series with each other, and each pair comprises a switching leg 652, 653, and 654. The switching legs 652-654 are electrically coupled in parallel with each other. Conductive components at first ends of switching legs 642-644 and 652-654 are electrically coupled with a first inverter terminal 680, and conductive components at second, opposite ends of switching legs 642-644 and 652-654 are electrically coupled with a second inverter terminal 682.

Rechargeable DC energy source 608 is electrically coupled in parallel with inverter system 602 across first inverter terminal 680 and second inverter terminal 682. In addition, DC bus capacitor 610 is electrically coupled across rechargeable DC energy source 608, and thus also is coupled in parallel with inverter system 602 across first inverter terminal 680 and second inverter terminal 682.

Similar to junction box 312 of FIG. 3, junction box 612 is adapted to receive and electrically couple with a three-phase electrical plug 690, which in turn is electrically coupled with an external load 692 (e.g., a device or an electric utility). In an alternate embodiment, system 600 may include a three-phase electrical plug (not illustrated), in place of junction box 612, as described above in conjunction with FIG. 2. In either embodiment (e.g., when system 200 includes either a junction box or a plug), the junction box or plug of the vehicle more generally may be considered a three-conductor AC power interface (e.g., AC power interface 114, FIG. 1).

Each of AC electric motors 604, 606 is a three phase motor that includes a set of three windings (or coils) 614, 615, 616, 617, 618, 619. Although not illustrated, AC electric motors 604, 606 each includes a stator assembly (including the windings) and a rotor assembly (including a ferromagnetic core, windings, and/or permanent magnets). The windings 614-616 of first AC electric motor 604 are electrically coupled with first inverter section 640 as follows: 1) a first winding 614 is electrically coupled with a connection point between the switches of leg 642; 2) a second winding 615 is electrically coupled with a connection point between the switches of leg 643; and 3) a third winding 616 is electrically coupled with a connection point between the switches of leg 644. Similarly, the windings 617-619 of second AC electric motor 606 are electrically coupled with second inverter section 660 as follows: 1) a first winding 617 is electrically coupled with a connection point between the switches of leg 652; 2) a second winding 618 is electrically coupled with a connection point between the switches of leg 653; and 3) a third winding 619 is electrically coupled with a connection point between the switches of leg 654.

A neutral point 632 of first AC electric motor 604 may be electrically coupled with a second conductor 633 between first AC electric motor 604 and junction box 612. Similarly, a neutral point 634 of second AC electric motor 606 may be electrically coupled with a third conductor 636 between second AC electric motor 606 and junction box 612.

Half bridge 611 includes include two series connected switches 694, 696, although system 600 may include more than two series connected switches to form a half bridge, in other embodiments. In an embodiment, switches 694, 696 may be configured substantially the same as the switches of first and second inverter sections 640, 650. In addition, the ends of the series connected switches 694, 696 are electrically coupled across rechargeable DC energy source 608, and thus also are coupled in parallel with DC bus capacitor 610 and inverter system 602 across first inverter terminal 680 and second inverter terminal 682.

In an embodiment, a connection point 623 between switches 694, 696 is electrically coupled with a first end of inductor 645, and a second end of inductor 645 is electrically coupled with a first conductor 631 between inductor 645 and junction box 612. Inductor 645 may include, for example, an inductor element adapted to provide current regulation for the current drawn from connection point 623.

As mentioned previously, through control of the switching of the first and second inverter sections 640, 650, motors 604, 606 are operated out of phase with each other (e.g., 120 degrees out of phase). In addition, in an embodiment, switching of switches 694, 696 of half bridge 511 is controlled to produce a current, at connection point 623, that is out of phase with the phases of the currents through motors 604, 606. For example, when the first and second inverter sections 640, 650 are controlled so that the currents at the neutral points 632, 634 are 120 degrees out of phase with each other, switches 694, 696 may be controlled to produce a current at connection point 623 that is 120 degrees out of phase with the motor currents. Accordingly, with the above-described couplings between the various system components, first conductor 632 may carry a first phase component of the AC power (e.g., from connection point 623), second conductor 633 may carry a second phase component of the AC power (e.g., from neutral point 632), and third conductor 634 may carry a third phase component of the AC power (e.g., from neutral point 634).

Figure 7:
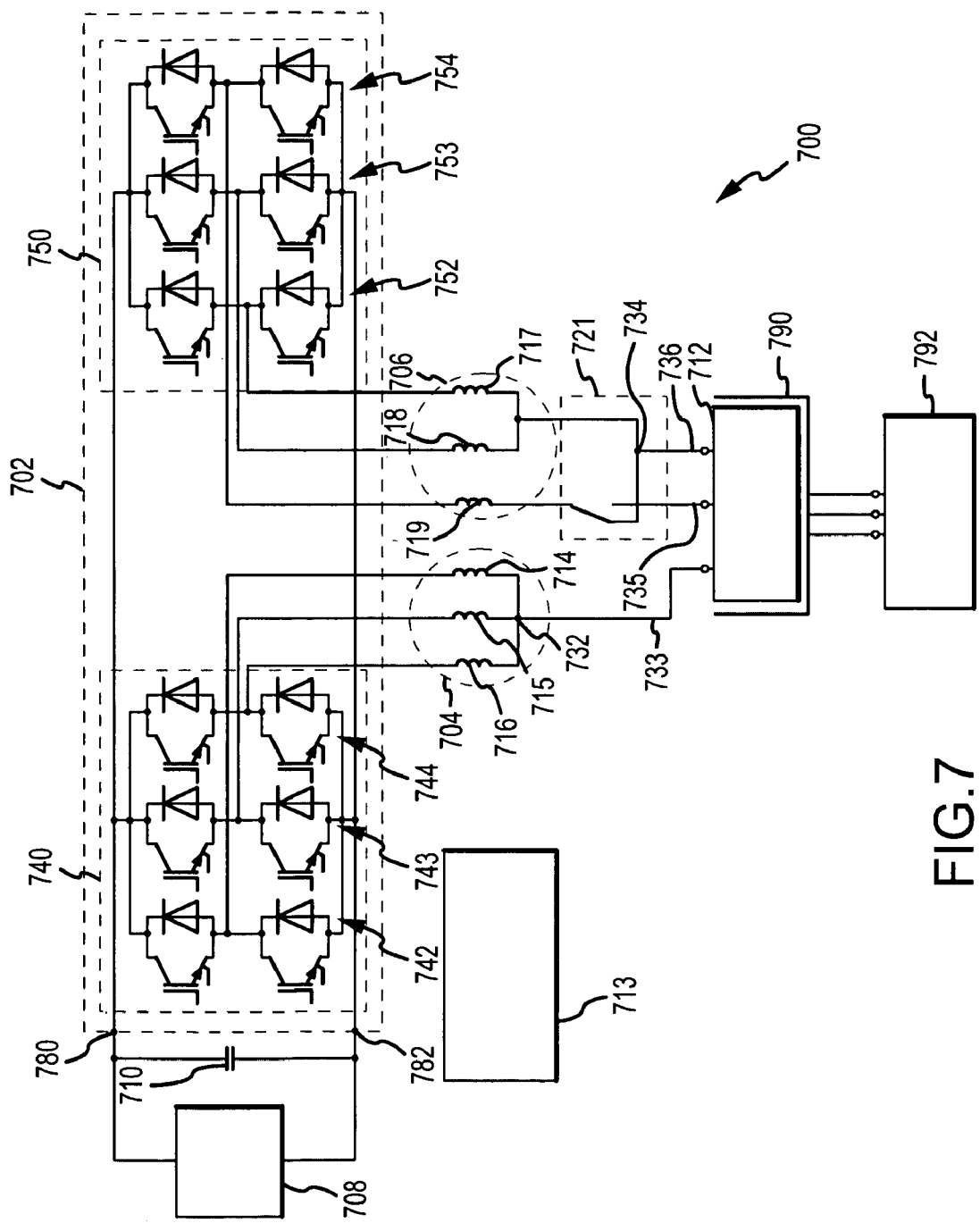
FIG. 7 is a schematic circuit representation of an embodiment of a vehicular power processing system, in accordance with a sixth example embodiment.

FIG. 7 is a schematic circuit representation of an embodiment of a vehicular power processing system 700, in accordance with a sixth example embodiment. System 700 may be suitable for use with a series-type hybrid electric vehicle or a power split-type hybrid electric vehicle, although system 700 may be adapted for use with other types of hybrid electric vehicles, as well. In an embodiment, system 700 includes an inverter system 702 (e.g., inverter system 116, FIG. 1), a first AC electric motor 704 (e.g., a drive motor 118, FIG. 1), a second AC electric motor 706 (e.g., an alternator 119, FIG. 1), a rechargeable DC energy source 708 (e.g., DC energy source 110, FIG. 1), a DC bus capacitor 710, a switch 721, a junction box 712, and an electronic control system 713 (e.g., electronic control system 108, FIG. 1). The functions and various embodiments relating to DC energy source 708 are similar to the functions and various embodiments of analogous components in FIG. 2 (e.g., DC energy source 208), and accordingly are not repeated here for purposes of brevity.

Inverter system 702 is operable as a bi-directional converter, as described in conjunction with FIG. 2, and includes a first inverter section 740 and a second inverter section 750. In an embodiment, inverter sections 740, 750 each include an array of six switches, which may be configured in the same manner and function the same as embodiments of switches 260-265, discussed above in conjunction with FIG. 2. In addition, during operation, an inverter control algorithm executed by electronic control system 713 provides transistor drive signals (not illustrated) depending on the function being implemented by system 700 at the time, as also discussed above in conjunction with FIG. 2.

As shown, pairs of switches in inverter section 740 are electrically coupled in series with each other, and each pair comprises a switching leg 742, 743, and 744. The switching legs 742-744 are electrically coupled in parallel with each other. Similarly, pairs of switches in inverter section 750 are electrically coupled in series with each other, and each pair comprises a switching leg 752, 753, and 754. The switching legs 752-754 are electrically coupled in parallel with each other. Conductive components at first ends of switching legs 742-744 and 752-754 are electrically coupled with a first inverter terminal 780, and conductive components at second, opposite ends of switching legs 742-744 and 752-754 are electrically coupled with a second inverter terminal 782.

Rechargeable DC energy source 708 is electrically coupled in parallel with inverter system 702 across first inverter terminal 780 and second inverter terminal 782. In addition, DC bus capacitor 710 is electrically coupled across rechargeable DC energy source 708, and thus also is coupled in parallel with inverter system 702 across first inverter terminal 780 and second inverter terminal 782.

Similar to junction box 312 of FIG. 3, junction box 712 is adapted to receive and electrically couple with a three-phase electrical plug 790, which in turn is electrically coupled with an external load 792 (e.g., a device or an electric utility). In an alternate embodiment, system 700 may include a three-phase electrical plug (not illustrated), in place of junction box 712, as described above in conjunction with FIG. 2. In either embodiment (e.g., when system 200 includes either a junction box or a plug), the junction box or plug of the vehicle more generally may be considered a three-conductor AC power interface (e.g., AC power interface 114, FIG. 1).

Each of AC electric motors 704, 706 is a three phase motor that includes a set of three windings (or coils) 714, 715, 716, 717, 718, 719. Although not illustrated, AC electric motors 704, 706 each includes a stator assembly (including the windings) and a rotor assembly (including a ferromagnetic core, windings, and/or permanent magnets). The windings 714-716 of first AC electric motor 704 are electrically coupled with first inverter section 740 as follows: 1) a first end of first winding 714 is electrically coupled with a connection point between the switches of leg 742; 2) a first end of a second winding 715 is electrically coupled with a connection point between the switches of leg 743; and 3) a first end of a third winding 716 is electrically coupled with a connection point between the switches of leg 744. Similarly, first ends of the windings 717-719 of second AC electric motor 706 are electrically coupled with second inverter section 750 as follows: 1) a first end of first winding 717 is electrically coupled with a connection point between the switches of leg 752; 2) a first end of second winding 718 is electrically coupled with a connection point between the switches of leg 753; and 3) a first end of third winding 719 is electrically coupled with a connection point between the switches of leg 754.

A neutral point 732 of first AC electric motor 704 may be electrically coupled with a first conductor 733 between first AC electric motor 704 and junction box 712. A neutral point 734 of AC electric motor 706 is separated, in an embodiment, by switch 721. In an embodiment, switch 721 includes a solid state switch in the form of an SCR. Switch 721 may be controlled into a first position (as shown in FIG. 7) or a second position. In an embodiment, the position of the switch 721 may be controlled by a coordinating circuit (not illustrated) within system 700 according to whether or not plug 790 is inserted into junction box 712. When plug 790 is not inserted into junction box 712, switch 721 may be controlled to remain in the first position. When plug 790 is inserted into the junction box 712, switch 721 may be controlled to remain in the second position, in an embodiment.

The second end of winding 719 is electrically coupled to switch 721. Accordingly, in the first position, the second end of winding 719 is disconnected from junction box 712, and is interconnected with the second ends of windings 717, 718 to form the neutral point 734. In an embodiment, switch 721 may be controlled into the first position in the propulsion state, for example. In the second position, the second end of winding 719 is electrically coupled with a second conductor 735 between junction box 712 and switch 721. Second ends of windings 717, 718 remain electrically coupled together and with a third conductor 736 between motor 706 and junction box 712.

Through control of the switching of the first and second inverter sections 740, 750, motor 704 is operated to produce a first phase current, and motor 706 is operated to produce second and third phase currents, where the first, second, and third phase currents are out of phase with each other (e.g., 120 degrees out of phase). More particularly, the switching of the first and second switching legs 752, 753 of inverter section 750 are controlled synchronously to produce a phase current at neutral point 734 of motor 706 that is out of phase (e.g., 120 degrees out of phase) with the phase current at the neutral point 732 of motor 704. In addition, switching of the third switching leg 754 of inverter section 750 is controlled to produce a phase current at the second end of winding 719 that is out of phase (e.g., 120 degrees out of phase) with the phase currents at neutral points 732, 734.

Accordingly, with the above-described couplings between the various system components, when switch 721 is in the second position, first conductor 733 may carry a first phase component of the AC power (e.g., from neutral point 732), second conductor 735 may carry a second phase component of the AC power (e.g., from winding 719), and third conductor 736 may carry a third phase component of the AC power (e.g., from neutral point 734). In an embodiment, switch 721 may be controlled into the second position in the parking state, for example, in order to interconnect system 700 with external load 792 via junction box 712, and to enable system 700 to provide the charging function, the utility-interconnected active power generator function, the utility-interconnected reactive power generator function, and/or the utility-interconnected active power filter function.

Figure 8:
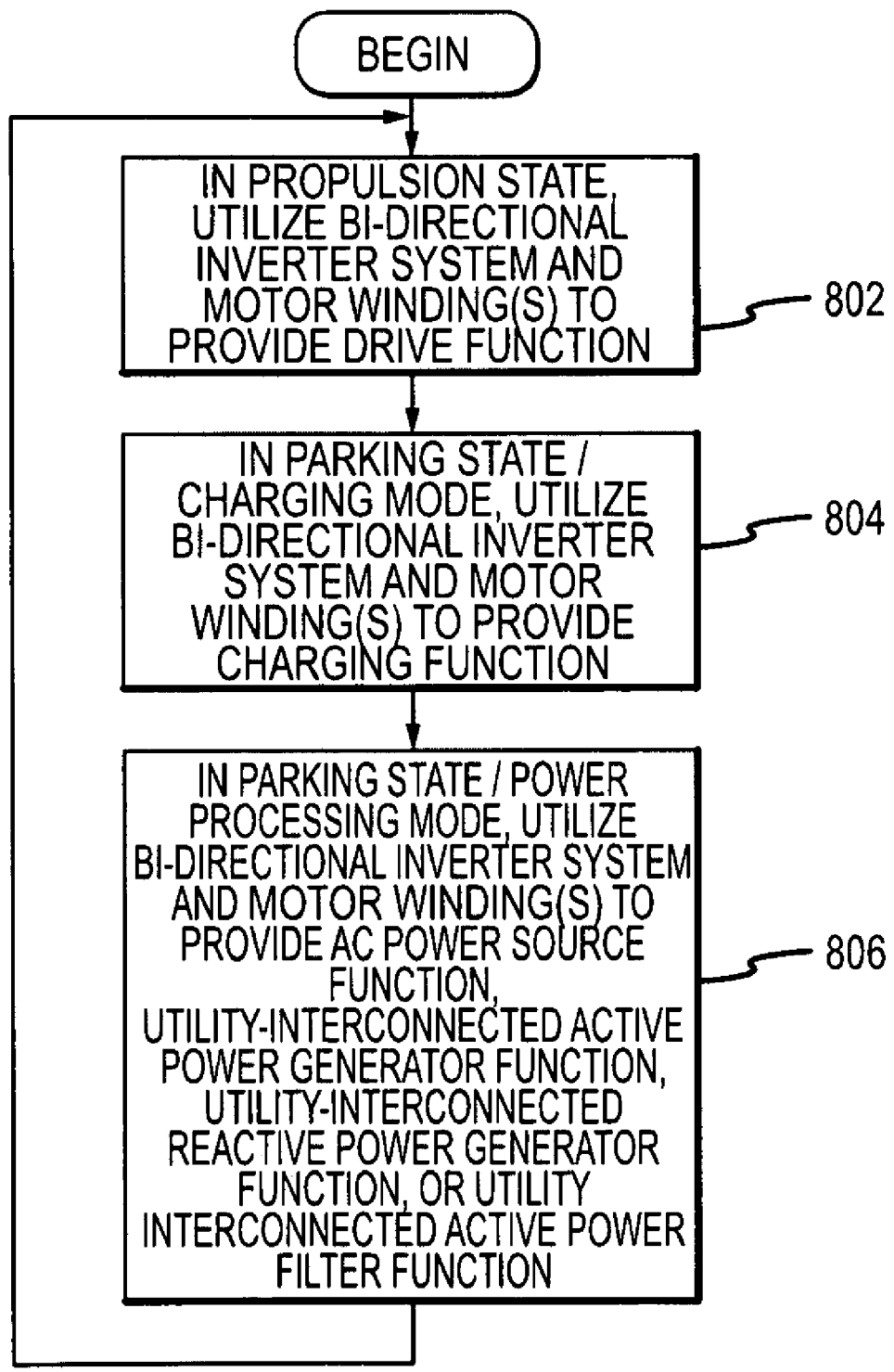
FIG. 8 is a flowchart of a method for operating a power processing system of a plug-in electric vehicle, in accordance with an example embodiment.

FIG. 8 is a flowchart of a method for operating a power processing system of a plug-in electric vehicle, in accordance with an example embodiment. The method of FIG. 8 may be implemented, for example, using any previously described embodiment of a power processing system that includes at least one DC energy source (e.g., a battery), at least one AC electric motor, and at least one bi-directional inverter system.

It is to be understood that the first time period, second time period, and third time period referred to below are intended to indicate non-overlapping time periods, but are not intended to indicate any sequence of the processes with which they are described. More particularly, although the process blocks of FIG. 8 are shown to occur in a particular example sequence and only one iteration of each process block is shown to occur, it is to be understood that the process blocks may occur in other sequences and/or multiple iterations or no iterations of a process block may occur during a time period. In practice, the processes associated with blocks 802, 804, and 806 may be implemented as a state machine, and transitions between any two states may occur at various times. However, for purposes of simplicity, the processes associated with blocks 802, 804, 806 are illustrated and described in the form of a flowchart.

The method may begin in step 802, when the vehicle is in a propulsion state (e.g., during a first time period when the vehicle is disconnected from any electric utility or external load). While in the propulsion state, the AC electric motor(s) and bi-directional inverter system of the power processing system may be utilized to provide a drive function, according to an embodiment. To provide the drive function, the system causes the bi-directional inverter system to draw direct DC electrical power from a DC energy source in response to receiving first control signals, to convert the DC power to AC power, and to provide the AC power to the at least one AC electric motor in order to propel the vehicle.

Step 804 may occur when the vehicle is in a parking state (e.g., at times the vehicle is connected with an electric utility) and a charging mode (e.g., during a second time period). While in the parking state and the charging mode, the windings of non-spinning AC electric motor(s) and bi-directional inverter system of the power processing system may be utilized to provide a charging function, according to an embodiment. To provide the charging function, the system causes the bi-directional inverter system to draw AC power from the windings of the AC electric motor(s) in response to receiving second control signals, to convert the AC power to DC power, and to provide the DC power to the DC energy source in order to recharge the DC energy source.

Step 806 may occur when the vehicle is in a parking state (e.g., at times the vehicle is connected with an electric utility) and a power processing mode (e.g., during a third time period). While in the parking state and the power processing mode, the windings of non-spinning AC electric motor(s) and bi-directional inverter system of the power processing system may be utilized to provide one or more power processing functions, according to an embodiment. As described in detail, previously, the power processing functions may include, but are not limited to, any one or more of an AC power source function, a utility-interconnected active power generator function, a utility-interconnected reactive power generator function, and/or a utility-interconnected active power filter function. To provide the power processing functions, the system causes the bi-directional inverter system to draw DC power from the DC energy source in response to receiving third control signals, to convert the DC power to AC power, and to provide the AC power to the windings at least one AC electric motor in order to provide AC power to an external load. In addition, to more specifically provide the utility-interconnected reactive power generator function, the system causes the bi-directional inverter system, during half of an electrical cycle, to draw AC power from the external load via the AC electric motor(s), to convert the AC power to DC power, and to provide the DC power to the DC energy source.

Thus, various embodiments of power processing systems and methods for use with plug-in electric vehicles have been described above. The embodiments may have one or more advantages over traditional systems in which a plug-in electric vehicle includes a battery charger. For example, an advantage may be that available system components (e.g., one or more inverters, DC bus capacitors, and motor windings) may be used the propulsion state to selectively apply drive power to the vehicle's traction system, and in the parking state to provide functions associated with a charging mode and/or a power processing mode. Accordingly, the function of a separate battery charger may not be needed, and such a battery charger may be excluded from the system. This may result in decreased vehicle weight (and thus extended driving range for a given battery charge) and decreased vehicle manufacturing cost. In addition, the space that would otherwise be used to house the battery charger may be used for other purposes or eliminated from the vehicle.

Another advantage may be a decrease in the operational expense of the vehicle to the consumer. For example, according to various embodiments, battery (or other DC energy source) charging function may be controlled by the system to occur during non-peak usage time periods, rather than during peak usage time periods. Accordingly, the consumer may be charged decreased utility fees from the utility company. In addition, unlike traditional battery chargers that enable current to flow in only one direction (e.g., from the electric utility to the vehicle's battery), embodiments described above are bi-directional, in that they enable current to flow from the electric utility to the vehicle's battery (or other DC energy source) during some time periods, and they enable current to flow from the vehicle's battery (or other DC energy source) to the electric utility during other time periods. Accordingly, power may be provided both from the electric utility to the vehicle and from the vehicle to the electric utility. In some cases, a utility company may provide the consumer with refunds or credits when the vehicle functions to the benefit of the utility company (e.g., by providing a utility-interconnected active power generator function, a utility-interconnected reactive power generator function, and/or a utility-interconnected active power filter function).

While various embodiments of systems and methods have been presented in the foregoing detailed description, it should be appreciated that a vast number of other variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A power processing system for use in a plug-in electric vehicle, the system comprising:
at least one alternating current (AC) electric motor having windings with first ends and second ends;
a bi-directional inverter system, electrically coupled with the first ends of the windings of the at least one AC electric motor, the bi-directional inverter system including a plurality of switches;
a three-conductor AC power interface with three conductors, wherein first ends of the three conductors are electrically coupled with the second ends of the windings, and second ends of the three conductors are adapted to be electrically connected with an external load in the form of an electric utility; and
an electronic control system, electrically coupled with the bi-directional inverter system, wherein the electronic control system is operable to provide a drive function by providing first control signals to the bi-directional inverter system to cause the bi-directional inverter system to draw direct current (DC) electrical power from a DC energy source of the vehicle, to convert the DC power to AC power, and to provide the AC power to the windings of the at least one AC electric motor in order to propel the vehicle, and wherein the electronic control system is further operable to provide a charging function by providing second control signals to the bi-directional inverter system to cause the bi-directional inverter system to draw AC power from the windings of the at least one AC electric motor, to convert the AC power to DC power, and to provide the DC power to the DC energy source in order to recharge the DC energy source, and wherein the bi-directional inverter system is further adapted cause the system to provide a utility-interconnected reactive power generator function by drawing DC power from the DC energy source in response to third control signals during a first half of an electrical cycle, converting the DC power to AC power during the first half of the electrical cycle, and providing the AC power to the windings of the at least one AC electric motor in order to provide AC power to the electric utility during the first half of the electrical cycle, and drawing AC power from the electric utility via the windings of the at least one AC electric motor in response to fourth control signals during a second half of the electrical cycle, converting the AC power to DC power during the second half of the electrical cycle, and providing the DC power to the DC energy source during the second half of the electrical cycle.

2. The system of claim 1, wherein the electronic control system is further operable in a power processing mode to provide third control signals to the bi-directional inverter system to cause the bi-directional inverter system to draw DC power from the DC energy source, to convert the DC power to AC power, and to provide the AC power to the windings of the at least one AC electric motor in order to provide AC power to the external load through the AC power interface.

3. The system of claim 2, wherein the external load includes an electricity-consuming device, and wherein the electronic control system is operable in the power processing mode to provide an AC power source function by providing the third control signals.

4. The system of claim 2, wherein the external load includes an electric utility, and wherein the electronic control system is operable in the power processing mode to provide a utility-interconnected active power generator function by providing the third control signals.

5. The system of claim 2, wherein the external load includes an electric utility, and wherein the electronic control system is operable in the power processing mode to provide a utility-interconnected active power filter function by providing the third control signals to cause the bi-directional inverter system to draw DC power from the DC energy source, to convert the DC power to AC power, and to provide the AC power to the windings of the at least one AC electric motor in order to supply the AC power to the electric utility to assist the electric utility in creating more sinusoidal voltage/current waveforms.

6. The system of claim 1, wherein
the bi-directional inverter system includes a first inverter section, a second inverter section, and a third inverter section, wherein the third inverter section has third switches that are lower power than first and second switches of the first inverter section and the second inverter section, respectively, and wherein phase components of AC power are limited by a capacity of the third inverter section, and wherein
the at least one AC electric motor includes a first motor having a first neutral point and first motor windings with first ends and second ends, a second motor having a second neutral point and second motor windings with first ends and second ends, and a third motor having a third neutral point and third motor windings with first ends and second ends, and
the system further comprises:
a first conductor between the first motor and the AC power interface;
a second conductor between the second motor and the AC power interface; and
a third conductor between the third motor and the AC power interface, wherein
the first ends of the first motor windings are electrically coupled with the first inverter section, and the first neutral point of the first motor is adapted to be electrically coupled with the first conductor, the first ends of the second motor windings are electrically coupled with the second inverter section, and the second neutral point of the second motor is adapted to be electrically coupled with the second conductor, and the first ends of the third motor windings are electrically coupled with the third inverter section, and the third neutral point of the third motor is adapted to be electrically coupled with the third conductor.

7. The system of claim 1, wherein:
the inverter system includes a first inverter section and a second inverter section, and wherein
the at least one AC electric motor includes a first motor and a second motor, wherein the first motor includes a first neutral point and first motor windings with first ends and second ends, and the second motor includes a second neutral point and second motor windings with first ends and second ends,
the system further comprising:
a half bridge electrically coupled in parallel with the bi-directional inverter system, wherein the half bridge includes at least two switches connected in series and a connection point between the at least two switches;
an inductor electrically coupled to the connection point between the at least two switches;
a first conductor electrically coupled between the inductor and the AC power interface;

a second conductor electrically coupled between the first motor and the AC power interface; and a third conductor electrically coupled between the second motor and the AC power interface, wherein the first ends of the first motor windings are electrically coupled with the first inverter section, the first neutral point is adapted to be electrically coupled with the second conductor, the first ends of the second motor windings are electrically coupled with the second inverter section, and the second neutral point of the second motor is adapted to be electrically coupled with the third conductor.

8. A power processing system for use in a plug-in electric vehicle, the system comprising:

at least one alternating current (AC) electric motor having windings;

a bi-directional inverter system, electrically coupled with the at least one AC electric motor, the bi-directional inverter system including a plurality of switches;

an AC power interface adapted to be electrically connected with an external load, wherein the external load includes an electric utility; and an electronic control system, electrically coupled with the bi-directional inverter system, wherein the electronic control system is operable in a power processing mode to provide a utility-interconnected reactive power generator function by providing first control signals to the bi-directional inverter system during a first half of an electrical cycle to cause the bi-directional inverter system to draw DC power from the DC energy source, to convert the DC power to AC power, and to provide the AC power to the windings of the at least one AC electric motor in order to provide AC power to the electric utility through the AC power interface, and by providing second control signals during a second half of the electrical cycle to cause the bi-directional inverter system to draw AC power from the electric utility via the windings of the at least one AC electric motor, to convert the AC power to DC power, and to provide the DC power to the DC energy source.

9. A power processing system for use in a plug-in electric vehicle, the system comprising:

a bi-directional inverter system, wherein the bi-directional inverter system includes an inverter section;

an AC electric motor, electrically coupled with the bi-directional inverter system, the AC electric motor having windings with first ends and second ends, wherein the first ends of the windings are electrically coupled with the inverter section;

a three-conductor AC power interface;

a switch array having three switches; and three conductors between the switch array and the three-conductor AC power interface, wherein each of the second ends of the windings of the AC electric motor is electrically coupled to a different one of the three switches of the switch array, and when the switches of the switch array are in a first position, the second ends are interconnected to form a neutral point of the first motor, and when the switches of the switch array are in a second position, each of the second ends are electrically coupled with one of the three conductors between the switch array and the three-conductor AC power interface.

10. A power processing system for use in a plug-in electric vehicle, the system comprising:

at least one alternating current (AC) electric motor having windings with first ends and second ends;

a bi-directional inverter system, electrically coupled with the first ends of the windings of the at least one AC electric motor, the bi-directional inverter system including a plurality of switches, wherein the bi-directional inverter system includes a first inverter section and a second inverter section;

a three-conductor AC power interface with three conductors, wherein first ends of the three conductors are electrically coupled with the second ends of the windings, and second ends of the three conductors are adapted to be electrically connected with an external load; and an electronic control system, electrically coupled with the bi-directional inverter system, wherein the electronic control system is operable to provide a drive function by providing first control signals to the bi-directional inverter system to cause the bi-directional inverter system to draw direct current (DC) electrical power from a DC energy source of the vehicle, to convert the DC power to AC power, and to provide the AC power to the windings of the at least one AC electric motor in order to propel the vehicle, and wherein the electronic control system is further operable to provide a charging function by providing second control signals to the bi-directional inverter system to cause the bi-directional inverter system to draw AC power from the windings of the at least one AC electric motor, to convert the AC power to DC power, and to provide the DC power to the DC energy source in order to recharge the DC energy source, and wherein the at least one AC electric motor includes a first motor and a second motor, wherein the first motor has a first neutral point and first motor windings with first ends and second ends, and the second motor has second motor windings with first ends and second ends, and wherein the system further comprises:

a plurality of series-connected DC bus capacitors having a connection point therebetween, wherein the plurality of series-connected DC bus capacitors is electrically coupled in parallel with the bi-directional inverter system;

an inductor electrically coupled to the connection point between the plurality of DC bus capacitors;

a first conductor electrically coupled between the inductor and the AC power interface;

a second conductor electrically coupled between the first motor and the AC power interface; and a third conductor between the second motor and the AC power interface, wherein the first ends of the first motor windings are electrically coupled with the first inverter section, and the first neutral point is adapted to be electrically coupled with the second conductor, and wherein the first ends of the second motor windings are electrically coupled with the second inverter section, and the second neutral point is adapted to be electrically coupled with the third conductor.

11. A power processing system for use in a plug-in electric vehicle, the system comprising:

at least one alternating current (AC) electric motor having windings with first ends and second ends;

a bi-directional inverter system, electrically coupled with the first ends of the windings of the at least one AC electric motor, the bi-directional inverter system including a plurality of switches, wherein the inverter system includes a first inverter section and a second inverter section;

a three-conductor AC power interface with three conductors, wherein first ends of the three conductors are electrically coupled with the second ends of the windings, and second ends of the three conductors are adapted to be electrically connected with an external load; and an electronic control system, electrically coupled with the bi-directional inverter system, wherein the electronic control system is operable to provide a drive function by providing first control signals to the bi-directional inverter system to cause the bi-directional inverter system to draw direct current (DC) electrical power from a DC energy source of the vehicle, to convert the DC power to AC power, and to provide the AC power to the windings of the at least one AC electric motor in order to propel the vehicle, and wherein the electronic control system is further operable to provide a charging function by providing second control signals to the bi-directional inverter system to cause the bi-directional inverter system to draw AC power from the windings of the at least one AC electric motor, to convert the AC power to DC power, and to provide the DC power to the DC energy source in order to recharge the DC energy source, and wherein the at least one AC electric motor includes a first motor and a second motor, wherein the first motor includes a first neutral point and first motor windings having first ends and second ends, and the second motor includes a second neutral point and second motor windings that include a first second motor winding, a second second motor winding, and a third second motor winding, wherein the second motor windings have first ends and second ends, and wherein the system further comprises:

a switch adapted to be switched between a first position and a second position;

a first conductor between the first motor and the AC power interface;

a second conductor between the second motor and the AC power interface; and a third conductor between the second motor and the AC power interface, wherein the first ends of the first motor windings are electrically coupled with the first inverter section, and the first neutral point is adapted to be electrically coupled with the first conductor, the first ends of the second motor windings are electrically coupled with the second inverter section, and a second end of the first second motor winding is electrically coupled with the switch, wherein the second end of the first second motor winding also is electrically coupled with a second end of the second second motor winding and a second end of the third second motor winding when the switch is in the first position, and wherein the second end of the first second motor winding is electrically coupled with the second conductor when the switch is in the second position, and wherein the second end of the second second motor winding and the second end of the third second motor winding are electrically coupled together to form the second neutral point.

12. A power processing system for use in a plug-in electric vehicle, the system comprising:

at least one alternating current (AC) electric motor having windings with first ends and second ends;

a bi-directional inverter system electrically coupled with the first ends of the windings of the at least one AC electric motor, the bi-directional inverter system including a plurality of switches, wherein the bi-directional inverter system is adapted cause the system to provide a drive function by drawing direct current (DC) electrical power from a DC energy source of the vehicle in response to receiving first control signals, converting the DC power to AC power, and providing the AC power to the windings of the at least one AC electric motor in order to propel the vehicle, and wherein the bi-directional inverter system is adapted cause the system to provide a charging function by drawing AC power from the windings of the at least one AC electric motor in response to receiving second control signals, converting the AC power to DC power, and providing the DC power to the DC energy source in order to recharge the DC energy source; and a three-conductor AC power interface with three conductors, wherein first ends of the three conductors are electrically coupled with the second ends of the windings, and second ends of the three conductors are adapted to be electrically connected with an external load in the form of an electric utility, and wherein the bi-directional inverter system is further adapted cause the system to provide a utility-interconnected reactive power generator function by drawing DC power from the DC energy source in response to third control signals during a first half of an electrical cycle, converting the DC power to AC power during the first half of the electrical cycle, and providing the AC power to the windings of the at least one AC electric motor in order to provide AC power to the electric utility during the first half of the electrical cycle, and drawing AC power from the electric utility via the windings of the at least one AC electric motor in response to fourth control signals during a second half of the electrical cycle, converting the AC power to DC power during the second half of the electrical cycle, and providing the DC power to the DC energy source during the second half of the electrical cycle.

13. The system of claim 12, wherein the AC power interface is adapted to electrically connect with an external load in the form of an electricity-consuming device, and wherein the bi-directional inverter system is further adapted cause the system to provide an AC power source function by drawing DC power from the DC energy source in response to third control signals, converting the DC power to AC power, and providing the AC power to the windings of the at least one AC electric motor in order to provide AC power to the electricity-consuming device.

14. The system of claim 12, wherein the AC power interface is adapted to electrically connect with an external load in the form of an electric utility, and wherein the bi-directional inverter system is further adapted cause the system to provide a utility-interconnected active power generator function by drawing DC power from the DC energy source in response to third control signals, converting the DC power to AC power, and providing the AC power to the windings of the at least one AC electric motor in order to provide AC power to the electric utility.

15. The system of claim 12, wherein the AC power interface is adapted to electrically connect with an external load in the form of an electric utility, and wherein the bi-directional inverter system is further adapted cause the system to provide a utility-interconnected active power filter function by drawing DC power from the DC energy source in response to third control signals, converting the DC power to AC power, and providing the AC power to the windings of the at least one AC electric motor in order to supply the AC power to the electric utility to assist the electric utility in creating more sinusoidal voltage/current waveforms.

16. A method for operating a power processing system of a plug-in electric vehicle, the method comprising the steps of:
providing first control signals to a bi-directional inverter system of the vehicle, during a first time period, which cause the bi-directional inverter system to draw direct current (DC) electrical power from a DC energy source of the vehicle in response to the first control signals, to convert the DC power to alternating current (AC) power, and to provide the AC power to first ends of windings of at least one AC electric motor of the vehicle in order to propel the vehicle, thus providing a drive function; and
providing second control signals to the bi-directional inverter system, during a second time period, which cause the bi-directional inverter system to draw AC power from the windings of the at least one AC electric motor in response to receiving the second control signals, to convert the AC power to DC power, and to provide the DC power to the DC energy source in order to recharge the DC energy source, thus providing a charging function; and
providing third control signals to the bi-directional inverter system, during a third time period, which cause the bi-directional inverter system to draw DC power from the DC energy source in response to receiving the third control signals, to convert the DC power to AC power, and to provide the AC power to the windings of the at least one AC electric motor in order to provide AC power to an external load coupled, via a three-conductor AC power interface with three conductors, to second ends of the windings of the at least one AC electric motor, thus providing a power processing mode, wherein the AC power interface is adapted to electrically connect with an external load in the form of an electric utility, and wherein the bi-directional inverter system is further adapted cause the system to provide a utility-interconnected reactive power generator function by drawing DC power from the DC energy source in response to fourth control signals during a first half of an electrical cycle, converting the DC power to AC power during the first half of the electrical cycle, and providing the AC power to the windings of the at least one AC electric motor in order to provide AC power to the electric utility during the first half of the electrical cycle, and drawing AC power from the electric utility via the windings of the at least one AC electric motor in response to fifth control signals during a second half of the electrical cycle, converting the AC power to DC power during the second half of the electrical cycle, and providing the DC power to the DC energy source during the second half of the electrical cycle.

17. The method of claim 16, wherein the power processing system automatically switches to the power processing mode at a first time of day, and the power processing system automatically switches to the charging function at a second time of day.

18. The method of claim 16, wherein the second time period corresponds to a non-peak usage time period for an electric utility, and the third time period corresponds to a peak usage time period for the electric utility.

19. The method of claim 16, further comprising:
providing a user of the power processing system with an option, via a user interface, to choose between the charging function and the power processing mode,
wherein the power processing system switches to the charging function or to the power processing mode based on a user input through the user interface.

* * * * *